(12) United States Patent
Okuhara et al.

(10) Patent No.: US 6,603,078 B2
(45) Date of Patent: Aug. 5, 2003

(54) GROMMET

(75) Inventors: Takashi Okuhara, Yokkaichi (JP);
Yoshimi Uchida, Yokkaichi (JP);
Tsutomu Sakata, Yokkaichi (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 0 days.

(21) Appl. No.: 09/956,871

(22) Filed: Sep. 21, 2001

(65) Prior Publication Data
US 2002/0036098 A1 Mar. 28, 2002

(30) Foreign Application Priority Data

Sep. 22, 2000 (JP) .......... 2000-288700
Jan. 25, 2001 (JP) .......... 2001-017542

(51) Int. Cl.⁷ .......... H01B 17/26
(52) U.S. Cl. .......... 174/153 G; 174/65 G; 16/2.1; 248/56
(58) Field of Search .......... 174/31 R, 65 R, 174/65 G, 152 G, 152 R, 153 G, 167; 16/2.1, 2.2; 248/56

(56) References Cited

U.S. PATENT DOCUMENTS

| | | | |
|---|---|---|---|
| 5,739,475 A | * 4/1998 | Fujisawa et al. | 174/153 G |
| 5,774,934 A | * 7/1998 | Fujita et al. | 174/153 G |
| 5,856,635 A | * 1/1999 | Fujisawa et al. | 174/153 G |
| 5,981,877 A | * 11/1999 | Sakata et al. | 174/153 G |
| 6,058,562 A | * 5/2000 | Satou et al. | 174/153 G |
| 6,240,597 B1 | * 6/2001 | Mochizuki | 174/153 G |
| 6,267,385 B1 | * 7/2001 | Okamoto et al. | 16/2.1 |
| 6,353,185 B1 | * 3/2002 | Sakata | 174/153 G |
| 6,402,155 B2 | * 6/2002 | Sakata | 174/153 G |

FOREIGN PATENT DOCUMENTS

| | | | |
|---|---|---|---|
| DE | 19904549 | 8/2000 | |
| EP | 0888931 | 1/1999 | |
| FR | 2547452 | 12/1984 | |
| JP | 2-125518 | 10/1990 | |
| JP | 406231643 A | * 8/1994 | 174/153 G |
| JP | 9-69320 | 3/1997 | |
| JP | 9-82161 | 3/1997 | |
| JP | 10-12072 | 1/1998 | |
| JP | 11-27834 | 1/1999 | |

OTHER PUBLICATIONS

English Language Abstract of DE 199 04 549.
English Language Abstract of FR 2 547 452.

* cited by examiner

Primary Examiner—Anthony Dinkins
Assistant Examiner—Adolfo Nino
(74) Attorney, Agent, or Firm—Greenblum & Bernstein, P.L.C.

(57) ABSTRACT

A grommet has a plurality of projecting strip portions provided on an outer peripheral surface of a tapered portion, extending in an axial direction of the tapered portion and being spaced from each other in a circumferential direction. The grommet also includes at least one sunken portion, which defines the outer peripheral surface of the tapered portion between adjacent projecting strip portions. The sunken portion includes a groove extending in an axial direction of the grommet.

32 Claims, 19 Drawing Sheets

FIG. 8(A)
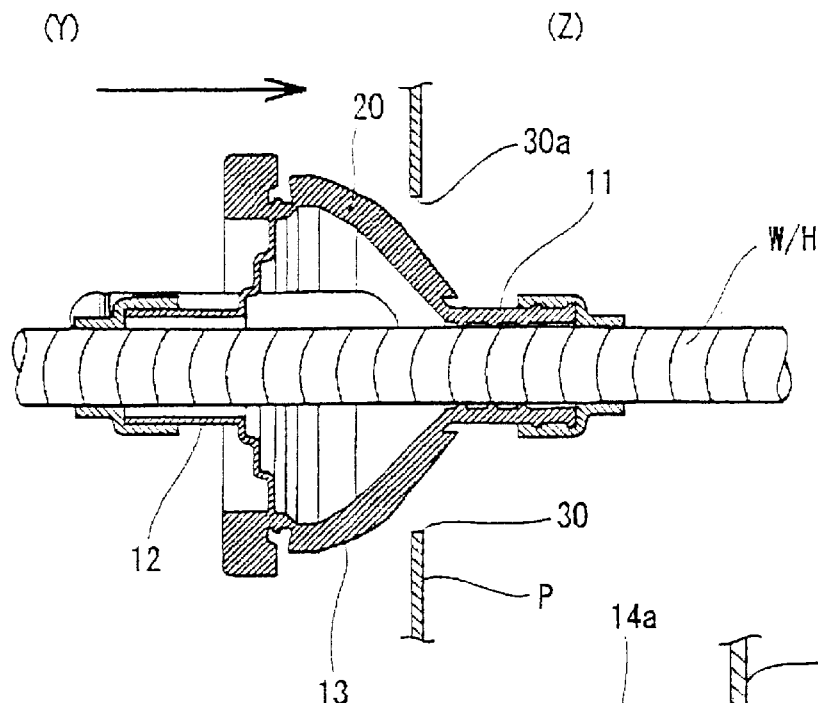
FIG. 8(B)
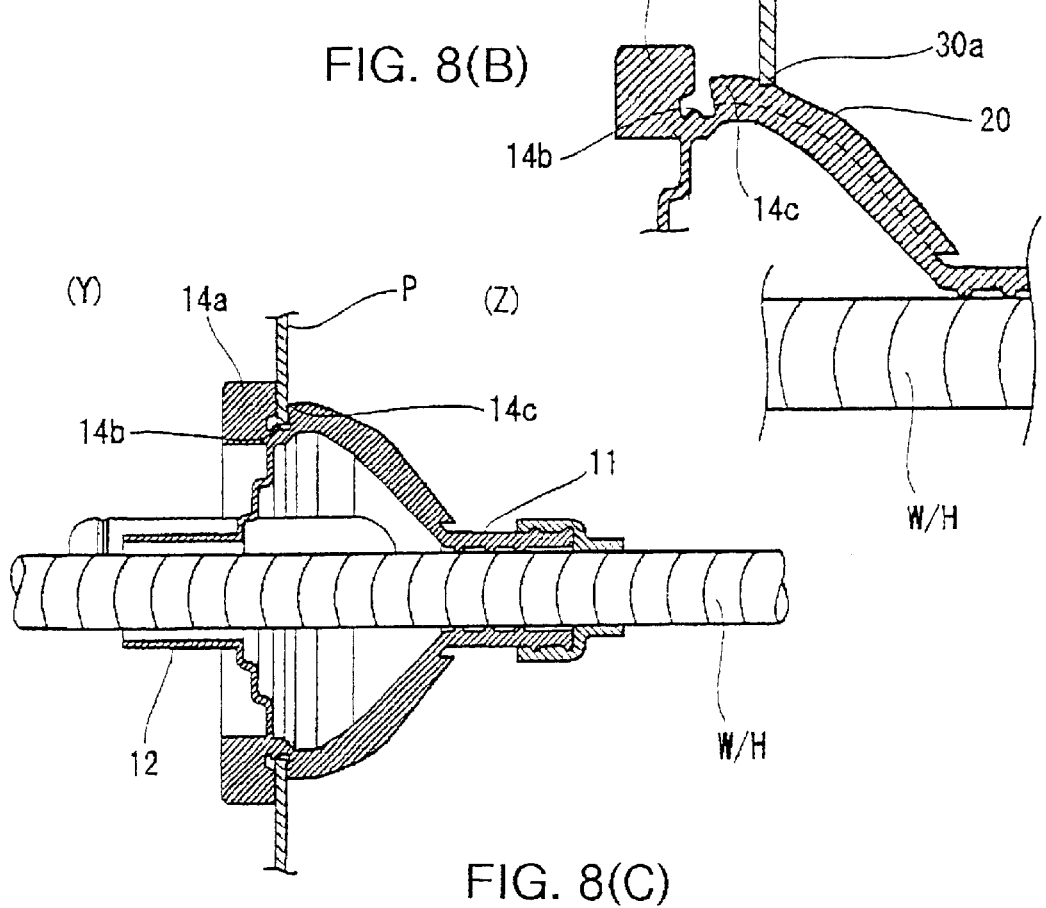
FIG. 8(C)

FIG. 24(A)
PRIOR ART
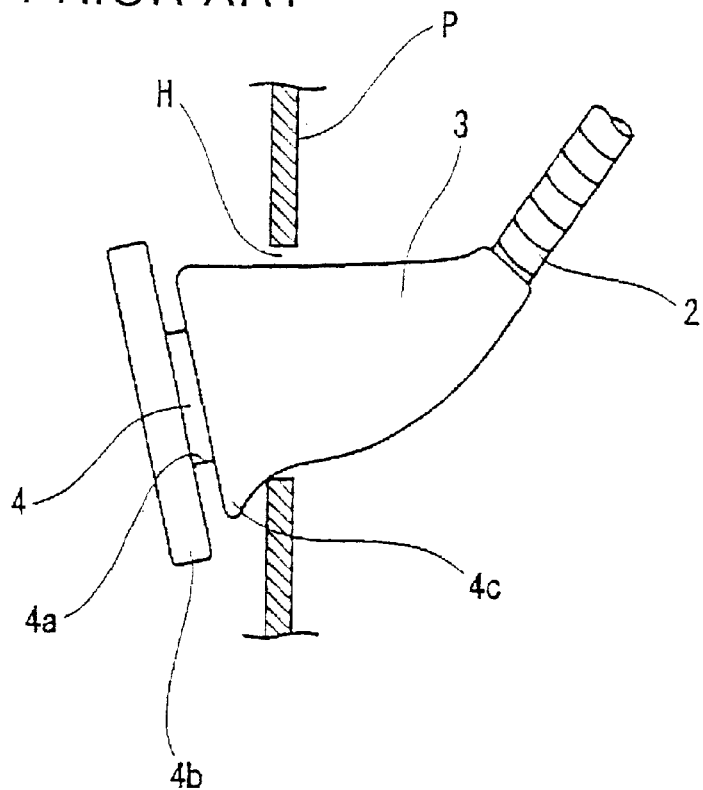
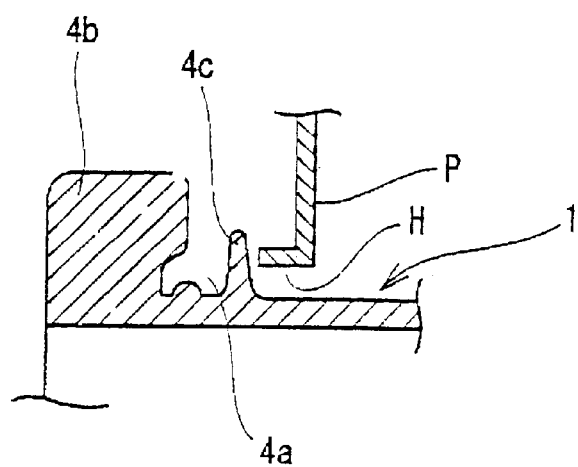
FIG. 24(B)
PRIOR ART

GROMMET

BACKGROUND OF THE INVENTION

1. Field of Invention

This invention relates to a grommet. In particular, this invention relates to a grommet that engages around a wire harness to be mounted on an automobile, and is mounted in a through hole of an automobile body panel, and improves protection of the wire harness at a position where the wire harness passes through the hole, as well as improving waterproofness and dustproofness.

2. Description of Related Art

Conventionally, a grommet engages around a wire harness to be mounted to extend from an engine compartment to a passenger compartment of an automobile, and the grommet is mounted in a though hole in an automobile body panel that divides the engine compartment from the passenger compartment. Thus, the wire harness passing through the through hole is protected, and intrusion of water, dust and sound from the engine compartment side to the passenger compartment side is prevented.

As the grommet described above, a so-called one motion grommet is provided. When the one motion grommet is simply pressed into the through hole in the automobile body panel from one side to the other, an automobile body engagement recess provided on an outer peripheral surface of the grommet engages with an edge of the through hole.

As shown in FIG. 21, the above-described grommet 1 is provided with a small-diameter cylindrical portion 2, and a tapered portion 3 which extends from an end of the small-diameter portion 2. The tapered portion 3 is provided with an automobile body engagement recess 4 around a larger diameter end. Both side walls facing each other across a groove 4a of the automobile body engagement recess 4 include a vertical wall 4b at the larger diameter side and an inclined wall 4c at a smaller diameter side. A wire harness W/H (FIG. 22) is inserted into a hollow portion extending from the small-diameter cylindrical portion 2 to the tapered portion 3 of the above-described grommet 1, and the grommet 1 is fixed with the wire harness W/H using a tape T at an end of the small-diameter cylindrical portion.

As shown in FIG. 22, during a mounting operation of the grommet 1 into the through hole H of the automobile body panel P, the grommet 1 is inserted into the through hole H from the small-diameter cylindrical portion 2, and the inclined wall 4c is pressed inwardly and deformed to pass through the through hole 4. Then, the inclined wall 4c, which recovers its original shape after passing through the through hole H, and the vertical wall 4b are tightly pressed into contact with both surfaces of the automobile panel P, respectively. Thus, the automobile body engagement recess 4 of the grommet 1 engages with the through hole H of the automobile body panel P.

In addition, as shown in FIG. 23, in the above-described one motion grommet, since the diameter is smoothly enlarged in a direction from the small-diameter cylindrical portion 2, which is an insertion side, to the inclined wall 4c, no tactile sensation can be felt and it is difficult for the operator to recognize the position from which the operator must forcefully press the grommet. In other words, when the inclined wall 4c is bent in the diameter-reducing direction to pass through the through hole, if a strong pressing force is applied without stopping when a large pressing force is required, the grommet can be inserted into the through hole efficiently. However, the operator cannot recognize the position where the force to be applied without stopping is required, and thus may apply an excessive force from the beginning, and an extra force might be required in the operation.

However, as shown in FIGS. 24(A) and 24(B), when the one motion grommet 1 is inserted into the through hole H so as to be inclined, one side of the tapered portion 3 is pressed excessively, and thus, an outer peripheral surface of a thin portion of the tapered portion 3, extending to the inclined wall 4c of the automobile body engagement recess 4, is deformed inwardly. The inclined wall 4c, which must be bend inwardly, is bent and warped (flipped over) outwardly, and the inclined wall 4c touches the automobile body panel P. Thus, the grommet is prevented from passing through the through hole H.

When the grommet 1 is inserted straight so that the center axis of the grommet 1 is aligned with the center of the through hole H, the above-described problem does not occur. However, during the insertion operation of the grommet 1 into the through hole, it is sometimes difficult to insert the grommet 1 into the through hole straight, because of the restriction on a space. Thus, in many cases, the grommet is inserted in an inclining posture.

Further, if the tapered portion of the grommet 1 is thick so as to be incapable of being bent, the above-described problem is resolved to a certain extent. However, in that case, an insertion force required to insert the grommet into the through hole become larger.

On the other hand, if the tapered portion is too thin, since the stiffness of the tapered portion becomes small, and thus, the tapered portion becomes easily extended while the inserting operation is performed, an insertion stroke becomes long.

Accordingly, the present invention is provided in view of the above-described problems, and an objective of the present invention is to prevent the insertion force from being too large, and to enable a grommet to be mounted into a through hole of an automobile panel, even if the grommet is inserted in an inclining posture, and to reduce extension of the grommet at the time of insertion into the through hole and thus, to shorten the insertion stroke.

Another objective of the present invention is to remove useless consumption of energy of an operation by providing a reasonable point at the position where a force must be applied without stopping to press the grommet into the through hole, during the inserting operation of the grommet into the through hole of the automobile body panel.

SUMMARY OF THE INVENTION

To achieve the above and/or other goals, the present invention provides a grommet configured to engage around an outer periphery of a wire harness and to be mounted in a through hole of an automobile body panel. The grommet includes a tubular portion, a tapered portion extending from one end of the tubular portion, a first wall provided around the tapered portion at a large diameter end, a second wall provided around the tapered portion and located at a small diameter side of the first wall and a plurality of projecting strip portions provided on an outer peripheral surface of the tapered portion. The tapered portion includes an automobile body engagement recess, formed by the first and second walls, provided on an outer peripheral surface of the tapered portion to engage with the automobile body panel. The second wall faces the first wall across the automobile body engagement recess. The plurality of projecting strip portions extend in an axial direction of the tapered portion and are spaced from each other in a circumferential direction. The plurality of the projecting strip portions are arranged close to each other at a small diameter side of the tapered portion and are radially spread toward the large diameter end. The grommet further includes at least one sunken portion that is defined as the outer peripheral surface of the tapered portion between adjacent projecting strip portions. The sunken portion includes a groove extending in the axial direction. The second (inclined) wall is bent inwardly to enable the grommet to pass through the through hole, when the grommet is being mounted in the through hole.

Preferably, the groove extends between a periphery of a small diameter end, connecting to the tubular portion, and a periphery of an end of the second wall.

As described above, if a groove is provided extending in the axial direction between a periphery of a small diameter end, connecting to the tubular portion, and a periphery of the automobile body engagement recess, since the portion of the groove is thinned, the grommet becomes easy to bend. Accordingly, even if the grommet is inserted in an inclining posture and is hooked by the inner peripheral surface of the through hole, the grommet is bent and the inserting posture is easily corrected.

When the outer projecting strip portions are provided on the outer peripheral surface of the grommet, and when the grommet is inserted in an inclining posture, first, the outer projecting strip portions touch the inner peripheral surface of the through hole. Accordingly, the operator can recognize the inclined insertion, and reinsert the grommet in a straight manner.

Further, if the outer projecting strip portions are provided on the outer peripheral surface of the tapered portion, when the grommet is inserted in an inclining posture, the phenomenon in which the thin tapered portion extending to the inclined wall of the automobile body engagement recess is warped outwardly (flipped over) at the side contacting the inner peripheral surface of the through hole, does not occur. Accordingly, the problem that occurred at the time of inclined insertion in the conventional grommet can be obviated.

Thus, if the projecting strip portions are arranged close to each other at the small diameter side, it is favorable for the correction of the direction at the time of inclined insertion. When the grommet is inserted in a straight manner, even if the projecting strip portions are arranged close to each other, since they do not contact the inner peripheral surface of the through hole, the inserting force does not increase.

On the other hand, since the area of the thin sunken portion becomes larger toward the large diameter side, the grommet is easily bent in a diameter reducing direction, and the inserting force can be reduced.

Since the groove is provided in the sunken portion, the grommet is easily bent inwardly about the center groove, when the outer surface of the projecting strip portions contacts the inner peripheral surface of the through hole.

The groove can be a single center groove provided at the center of the sunken portion, or can be two side grooves provided along the proximal portions of the projecting strip portions. It is possible to provide both the center groove and the two side grooves. In this case, preferably, both side grooves extend to the end of the inclined (second) wall and the center groove extends only to the periphery of the end of the inclined (second) wall, i.e., is shorter than the side grooves.

Further, a V-shaped groove that connects the side grooves to the end of the center groove can also be provided.

As described above, if the single center groove is provided at the center of the triangle sunken portion, the grommet is easily bent about the center groove. Further, if the groove is provided along the proximal portion of the projecting strip portion, the proximal portion of the projecting strip portion is easily bent. Further, if both the single center groove and the two side grooves along the proximal portions are provided, the ease of bending is doubled. Furthermore, since the area of the sunken portion becomes larger toward the large diameter side, if the V-shaped groove, connecting the end of the center groove to both side grooves, is provided, the groove guides the sunken portion in the direction in which the sunken portion is folded, and the diameter of the tapered portion can be naturally reduced.

The projection amount of the above-described projecting strip portions is changed at a contact point where the projecting strip portions contact an inner peripheral surface of the through hole during the insertion into the through hole, so that the projection amount between the contact point and a large diameter side end of the projecting strip portions becomes small.

The portion where the projection amount becomes small, has a shape which the outer surface of the projecting strip portion is bent to have different inclination angle, or a curved (arc) shape.

Accordingly, when the grommet is inserted in the through hole of the automobile body panel, since the projection amount of the projecting strip portions changes, the tactile sensation is generated when the contact point reaches the panel position. From this contact point, the inclined wall must be pressed to be bend inwardly. Thus, from the time when the tactile sensation is generated, if the operator increases the force to press the grommet into the through hole without stopping when the tactile sensation is generated, the inserting operation of the grommet into the through hole becomes efficient. In addition, since the projection amount of the projecting strip portions becomes small from the contact point, the inserting force can be reduced.

Further, an opening is provided in the outer peripheral surface of the tapered portion and a cable insertion cylindrical portion, connecting to the opening, is provided on the interior of the tapered portion and extends outwardly from a thin end face portion. The opening is located in the sunken portion between the projecting strip portions.

As described above, if the cable insertion cylindrical portion is provided, when there are optional parts, a cable to connect to the optional parts is inserted into the cable insertion cylindrical portion, and can be inserted into the through hole of the automobile body panel. Thus, the grommet becomes more versatile.

An extending end of the cable insertion cylindrical portion is closed, and, at the time of use, the end is cut or broken off to provide an opening so that a cable can be inserted into therein.

Further, since the opening of the cable insertion cylindrical portion is provided in the sunken portion of the tapered portion, the sunken portion can be easily deformed, and thus, the inserting force at the time of insertion operation into the through hole can be reduced.

According to the another aspect of the present invention, a grommet configured to engage around an outer periphery of a wire harness and to be mounted in a through hole of an automobile body panel is provided. The grommet includes a tubular portion, a tapered portion extending from one end of the tubular portion, a first wall provided around the tapered portion at a large diameter end, and a second wall provided around the tapered portion and located at a small diameter side of the first wall, and a plurality of projecting strip portions provided on an outer peripheral surface of the tapered portion. The tapered portion includes an automobile body engagement recess, formed by the first and second walls, provided on an outer peripheral surface of the tapered portion to engage with the automobile body panel. The second wall faces the first wall across the automobile body engagement recess at a small diameter side of the first wall. The plurality of projecting strip portions extend in an axial direction of the tapered portion and are spaced from each other in a circumferential direction. The tapered portion further includes a recess in an inner peripheral surface of the tapered portion, the recess being located at an inner surface side of the second wall.

Further, since the recess is provided in the inner surface of the tapered portion, the inclined (second) wall is easily bent in a diameter reducing direction. As a result, the inserting force of the grommet can be reduced. Preferably, the recess is inclined toward the inner side of the bottom surface of the groove. According to this construction, the inclined (second) wall can be bent more easily.

In another aspect of the present invention, a grommet configured to engage around an outer periphery of a wire harness and to be mounted in a through hole of an automobile body panel is provided. The grommet includes a tubular portion, a tapered portion extending from one end of the tubular portion, a first wall provided around the tapered portion at a large diameter end, and a second wall provided around the tapered portion and located at a small diameter side of the first wall. The tapered portion includes an automobile body engagement recess, formed by the first and second walls, provided on an outer peripheral surface of the tapered portion to engage with the automobile body panel. The second wall faces the first wall across the automobile body engagement recess. The tapered portion further including a V-shape recess in an inner peripheral surface of the tapered portion at an inner surface side of the second wall. The V-shape recess has a shape substantially similar to an outline of the second wall so as to make the second wall thin.

As described above, if the V-shaped recess, which has a similar shape to the outline of the inclined (second) wall whose cross-section has a triangular shape is provided, the entire inclined (second) wall can be thinned. As a result, at the time of insertion into the through hole of the panel, the inclined (second) wall is easily bent inwardly and the inserting force can be reduced.

In a further aspect of the present invention, a grommet configured to engage around an outer periphery of a wire harness and to be mounted in a through hole of an automobile body panel is provided. The grommet includes a tubular portion, a tapered portion extending from one end of the tubular portion, a first wall provided around the tapered portion at a large diameter end, and a second wall provided around the tapered portion and located at a small diameter side of the first wall, a plurality of projecting strip portions provided on an outer peripheral surface of the tapered portion, a thin end face portion provided at an end of the large diameter side of the tapered portion and a second tubular portion extending outwardly from the center of the end face portion. The tapered portion includes an automobile body engagement recess, formed by the first and second walls, provided on an outer peripheral surface of the tapered portion to engage with the automobile body panel. The second wall faces the first wall across the automobile body engagement recess at a small diameter side of the first wall. The plurality of projecting strip portions extends in an axial direction of the tapered portion and are spaced from each other in a circumferential direction. The second tubular portion includes a pair of slits facing each other so that the second general cylindrical portion is divided into two generally half-cylindrical portions.

According to the above-described construction, the projecting strip portions provided on the outer surface of the tapered portion provides the above-described function. In addition, the second tubular portion is provided and the second tubular portion is divided into two pieces. As a result, after the grommet is mounted on the panel, it is difficult for the grommet to become separated from the panel.

In other words, the wire harness is inserted into the second generally (small diameter) cylindrical portion through the hollow portion (interior) of the tapered portion, and is fixed to the second tubular portion by taping.

Thus, if the wire harness is fixed to the second small diameter (generally) cylindrical portion located at the side opposing to the pressing (inserting) side, when a force tending to cause separation is applied to the first small diameter (generally) cylindrical portion of the grommet, since the wire harness is fixed to the second small diameter (generally) cylindrical portion, a resisting force against the direction of the separation is generated. Thus, the grommet is prevented from being separated from the panel.

Further, if a slit is provided in the second small diameter (generally) cylindrical portion to divide the second small diameter (generally) cylindrical portion into two pieces, the insertion of the wire harness becomes easy.

According to a further aspect of the present invention, a grommet configured to engage around an outer periphery of a wire harness and to be mounted in a through hole of an automobile body panel is provided. The grommet includes a tubular portion, a tapered portion extending from one end of the tubular portion, a first wall provided around the tapered portion at a large diameter end, a second wall provided around the tapered portion and located at a small diameter side of the first wall, a thin end face portion provided at an end of the large diameter side of the tapered portion and a second tubular portion extending outwardly from the center of the end face portion. The tapered portion includes an automobile body engagement recess, formed by the first and second walls, provided on an outer peripheral surface of the tapered portion to engage with the automobile body panel. The second wall faces the first wall across the automobile body engagement recess at a small diameter side of the first wall. The second tubular portion includes a pair of slits facing each other so that the second general cylindrical portion is divided into two generally half-cylindrical portions. The tapered portion further includes a recess in an inner peripheral surface of the tapered portion, the recess located at an inner surface side of the second wall.

In the grommet having the above-described construction, when the grommet is inserted into the through hole of the panel, the recess provided in the inner surface of the inclined (second) wall (tapered portion) realizes a small inserting force, and prevents the grommet from being separated from the panel, after the grommet is once mounted on the panel.

Preferably, the plurality of projecting strip portions extend between a small diameter end, connecting to the tubular portion, and an edge of the second wall. In addition, a projection amount of the plurality of projecting strip portions is changed at a contact point so that a first projection amount between the contact point and the edge of the second wall is smaller than a second projection amount between the contact point and a small diameter side end of the plurality of projecting strip portions. The contact point is located substantially at a position where an outer surface of the plurality of projecting strip portions first contacts an inner peripheral surface of the through hole when the grommet is being inserted into the through hole from the end of the grommet having the tubular portion.

The outer surface of the projecting strip portions may be bent at the contact point as a border so as to have different inclination angle. Instead, the outer surface may have a curved or arc shape from the contact point to the end of the inclined (second) wall.

Preferably, each of the plurality of projecting strip portions has a constant width in the circumferential direction along the axial direction, and the plurality of the projecting strip portions are arranged close to each other at a small diameter side of the tapered portion and are radially spread toward a large diameter side so as to define at least one sunken portion, which is in the outer peripheral surface of the tapered portion between adjacent projecting strip portions. The sunken portion includes a groove extending the axial direction.

In a still further aspect of the present invention, a grommet configured to engage around an outer periphery of a wire harness and to be mounted in a through hole of an automobile body panel is provided. The grommet includes a tubular portion, a tapered portion extending from one end of the tubular portion, a first wall provided around the tapered portion at a large diameter end, and a second wall provided around the tapered portion and located at a small diameter side of the first wall, and a plurality of projecting strip portions provided on an outer peripheral surface of the tapered portion. The tapered portion includes an automobile body engagement recess, formed by the first and second walls, provided on an outer peripheral surface of the tapered portion to engage with the automobile body panel. The second wall faces the first wall across the automobile body engagement recess at a small diameter side of the first wall. The plurality of projecting strip portions extend in an axial direction of the tapered portion and are spaced from each other in a circumferential direction. The tapered portion further includes a recess in an inner peripheral surface of the tapered portion, the recess being located at an inner surface side of the second wall. The grommet further includes at least one small stepped portion provided on a sunken portion of the outer peripheral surface of the tapered portion between adjacent outer projecting strip portions, the small stepped portion projecting from an edge of the second wall toward the tubular portion.

Similar to the conventional grommet, the grommet of the present invention is made of any suitable elastic material, such as an elastic or an elastomer, and has predetermined flexibility.

The end of small stepped portion for tactile sensation is raised in a direction substantially perpendicular to the outer peripheral surface of the tapered portion. Accordingly, when the grommet is being inserted into the through hole of the automobile body, the small stepped portion touches the periphery of the through hole and the operator feels tactile sensation.

When the operator feels the tactile sensation and concentrates his strength from the position to press the grommet without stopping, the operator can insert the grommet into the through hole without extra energy.

Preferably, a projection amount of the plurality of outer projecting strip portions changes in the axial direction, and the outer surface of the outer projecting strip portions has a straight line when the outer surface of the plurality of strip portions has a height from an axis of the grommet same as a height of the edge of the second wall. In addition, the small stepped portion extends linearly straight from the edge of the second wall to the position where the outer surface of the plurality of projecting strip portions changes to the straight line.

Thus, the small stepped portion projecting from the sunken portion does not exceed the outer projecting strip portions. Accordingly, the small stepped portion is not hooked by the periphery of the through hole of the automobile body and does not interfere the inserting operation. Further, if the portion for tactile sensation (small stepped portion) is provided on the outer projecting strip portion, the thickened portion by the small stepped portion becomes difficult to bend. However, since the small stepped portion for tactile sensation is provided on the sunken portion, the small stepped portion can be bent relatively easily and does not impede the reduction of the inserting force of the grommet.

Preferably, the outer peripheral surface of the tapered portion defining the sunken portion between the adjacent outer projecting strip portions includes a center groove at a center of the sunken portion in the circumferential direction and two outer side grooves along proximal portions of the plurality of outer projecting strip portions. The two outer side grooves extend to a periphery of the edge of the second wall. The center groove does not extend to the periphery of the edge of the second wall. The small stepped portion is provided on an extension of an end of the center groove. The two outer side grooves are located at both sides of the small stepped portion.

As described above, if the groove is provided in the sunken portion between the outer projecting strip portions, the sunken portion is bent extremely easily. Thus, while the stiffness is improved by providing the projecting strip portions of the tapered portion, the tapered portion can be bent smoothly in the diameter reducing direction at the time of insertion of the grommet into the through hole. Thus, the inserting force can be reduced.

In addition, if the grooves are located at both sides of the small diameter portion for tactile sensation, the small stepped portion becomes bent easily. Accordingly, the small stepped portion is bent easily by the pressing force and passes through the though hole of the automobile body.

In addition, the inner projecting strip portions can be provided on the inner peripheral surface of the tapered portion, so that the inner projecting strip portions oppose the outer projecting strip portions. Thus, if both the inner and outer projecting strip portions are provided on the thin tapered portion, the tapered portion is reinforced. Accordingly, when the grommet is inserted in an inclining posture, the phenomenon in which the thin tapered portion extending to the inclined wall of the automobile body engagement recess is warped outwardly (flipped over) at the side contacting the inner peripheral surface of the through hole, does not occur. Accordingly, the problem that occurred at the time of inclined insertion in the conventional grommet can be resolved. In addition, by increasing the stiffness of the tapered portion to suppress the extension of the tapered portion, the inserting stroke into the through hole of the automobile body can be shortened.

In particular, even if the thickness of the outer projecting strip portions provided on the outer peripheral surface of the tapered portion is small, since the inner projecting strip portions are provided on the inner peripheral surface of the tapered portion, opposing the outer projecting strip portions, the thickness of a sum of the outer projecting strip portion and the inner projecting strip portion becomes large, and a required reinforcement can be achieved. Accordingly, the thickness of the outer projecting strip portions provided on the outer peripheral surface of the tapered portion can be small, and thus, the outline of the entire grommet is prevented from being larger.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIGS. 8(A), 8(B) and 8(C) are views illustrating a grommet being inserted into a through hole according to the first embodiment of the present invention;

FIG. 24(A) is a view illustrating another problem of the conventional grommet; and FIG. 24(B) is an enlarged cross-sectional view of a primary portion of 24(A).

DETAILED DESCRIPTION OF PREFERRED EMBODIMENTS

Figure 1:
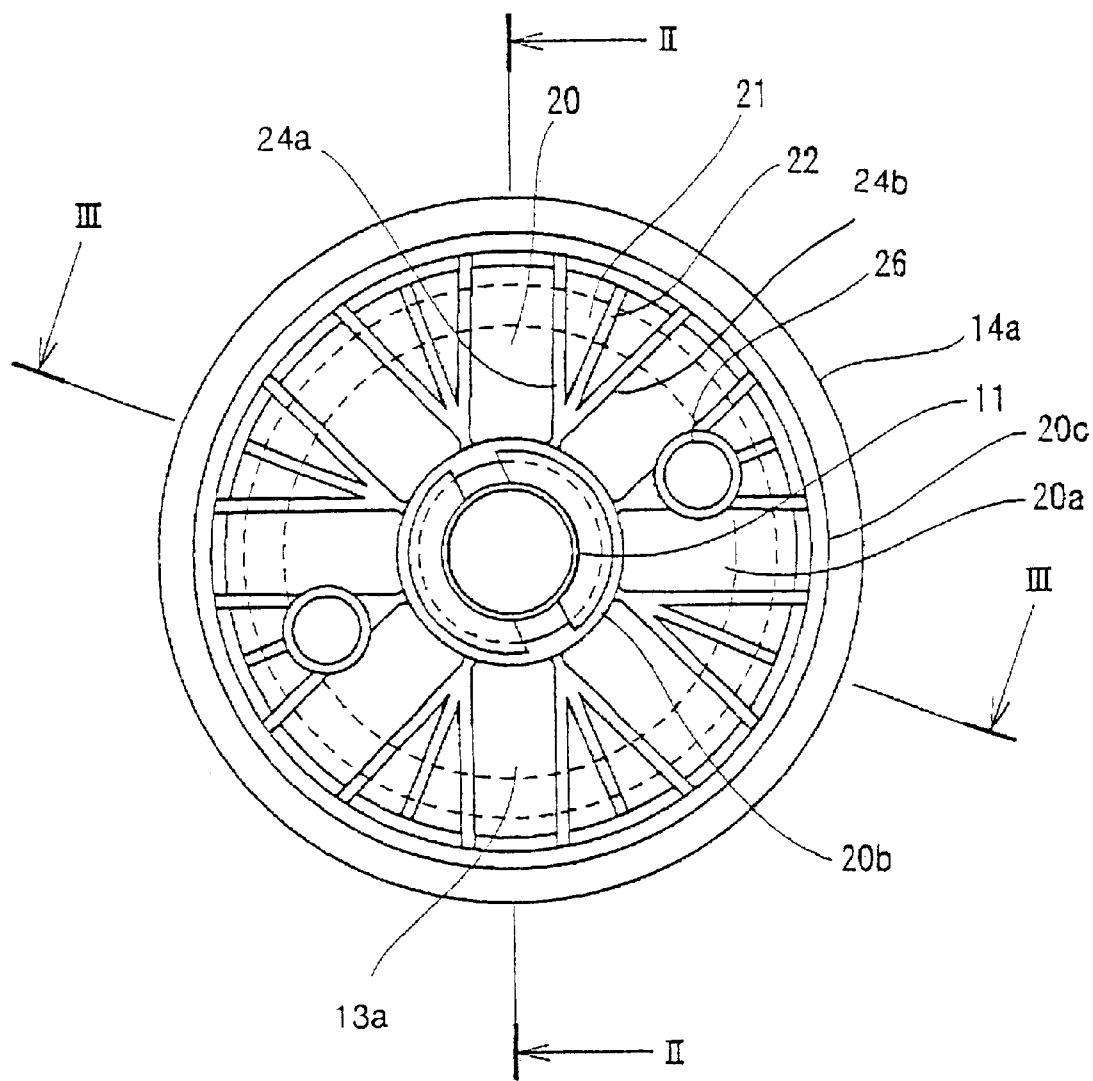
FIG. 1 is a front view of a grommet according to a first embodiment of the present invention.
Figure 2:
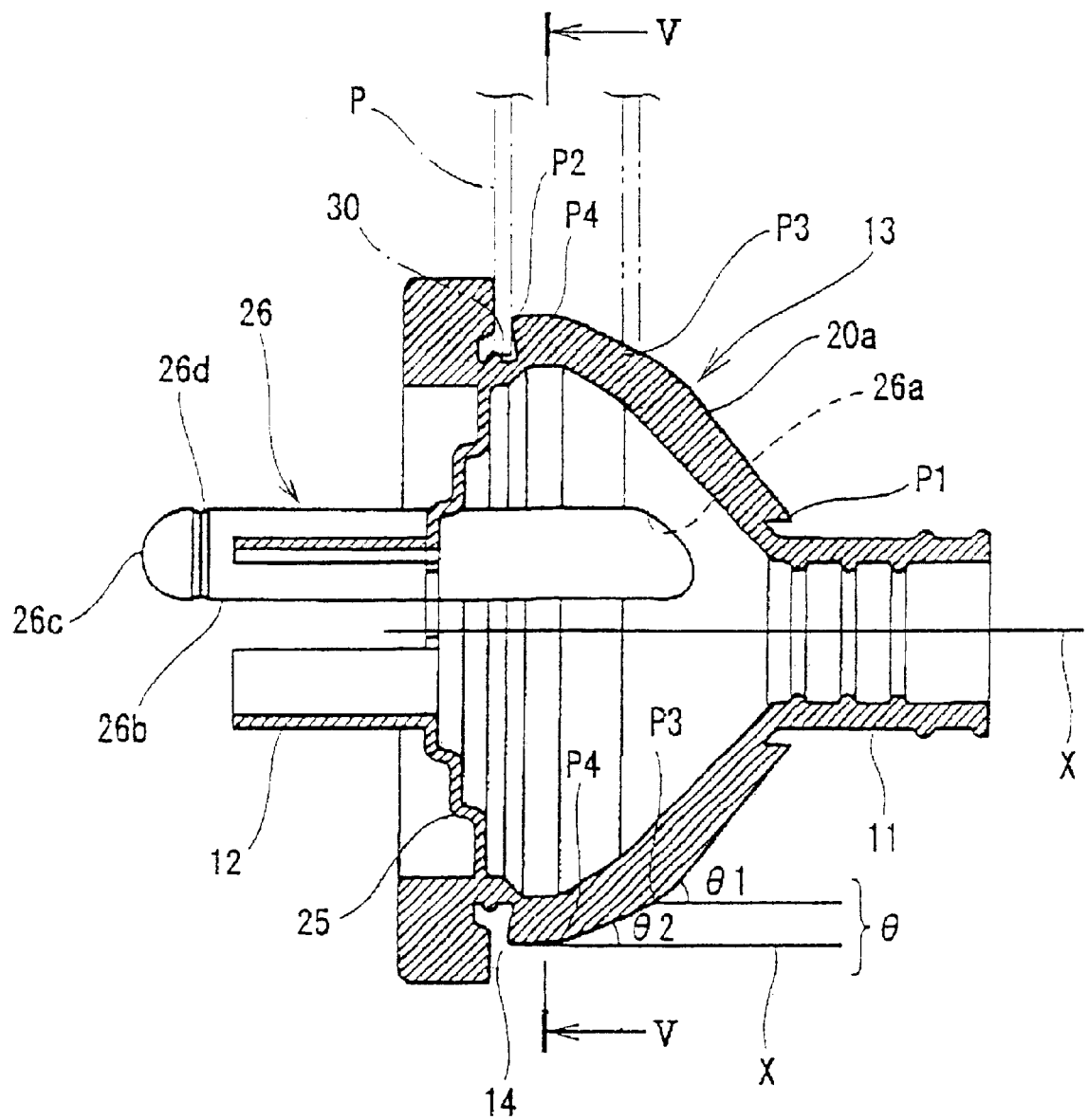
FIG. 2 is a cross-sectional view of the grommet shown in FIG. 1 taken along the line II—II of FIG. 1.
Figure 3:
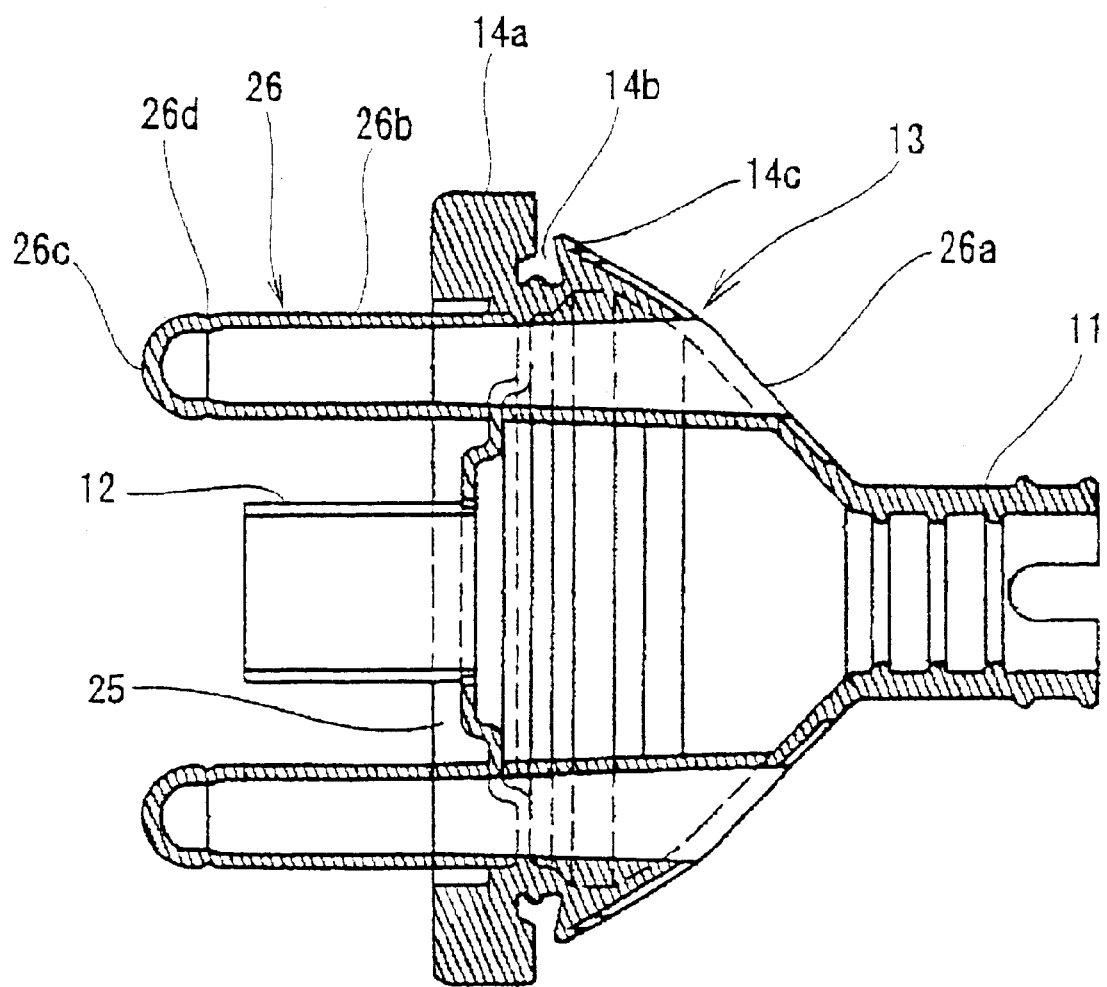
FIG. 3 is a cross-sectional view of the grommet shown in FIG. 1 taken along the line III—III of FIG. 1.
Figure 4:
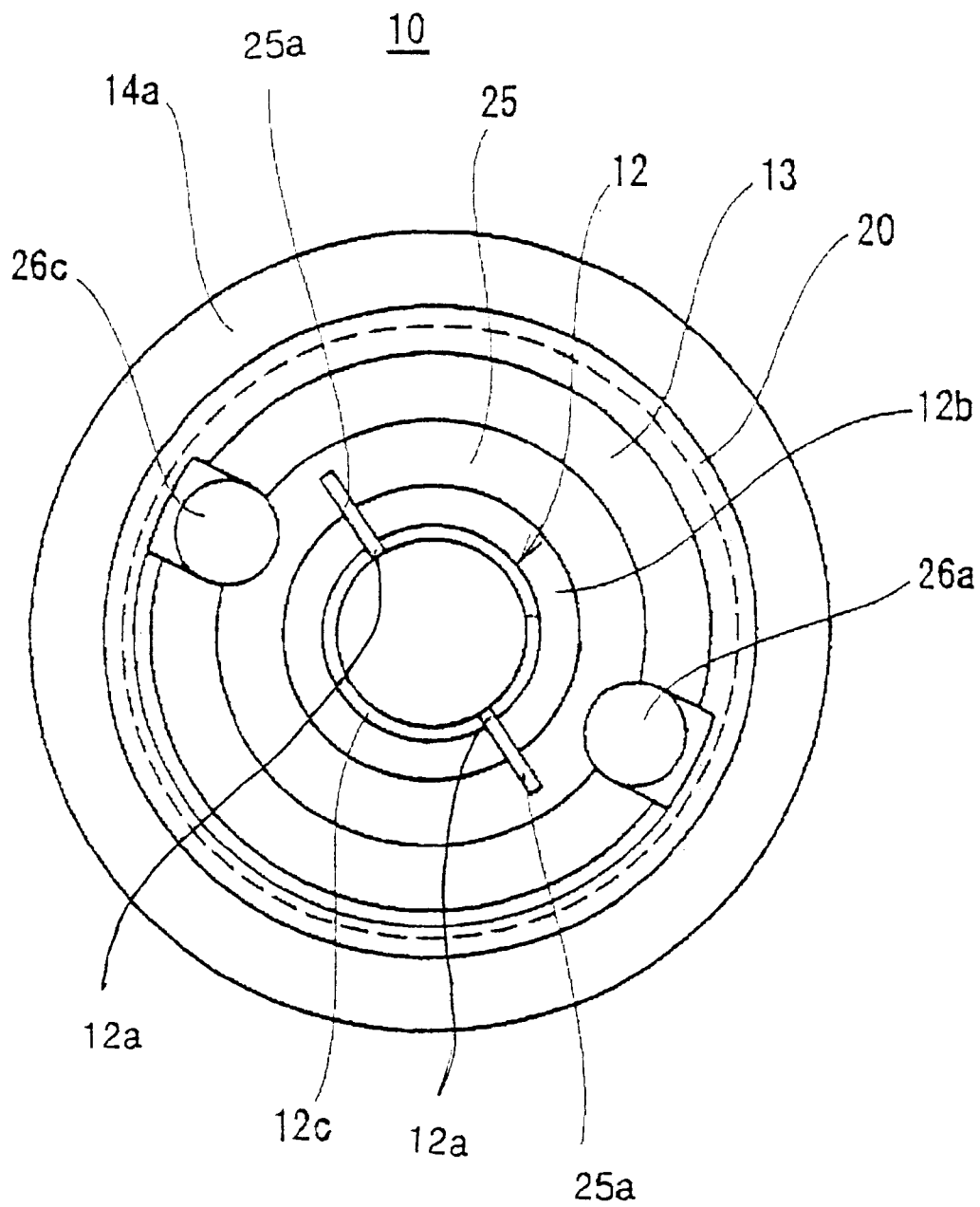
FIG. 4 is a rear view of a grommet of the first embodiment according to the present embodiment.
Figure 5:
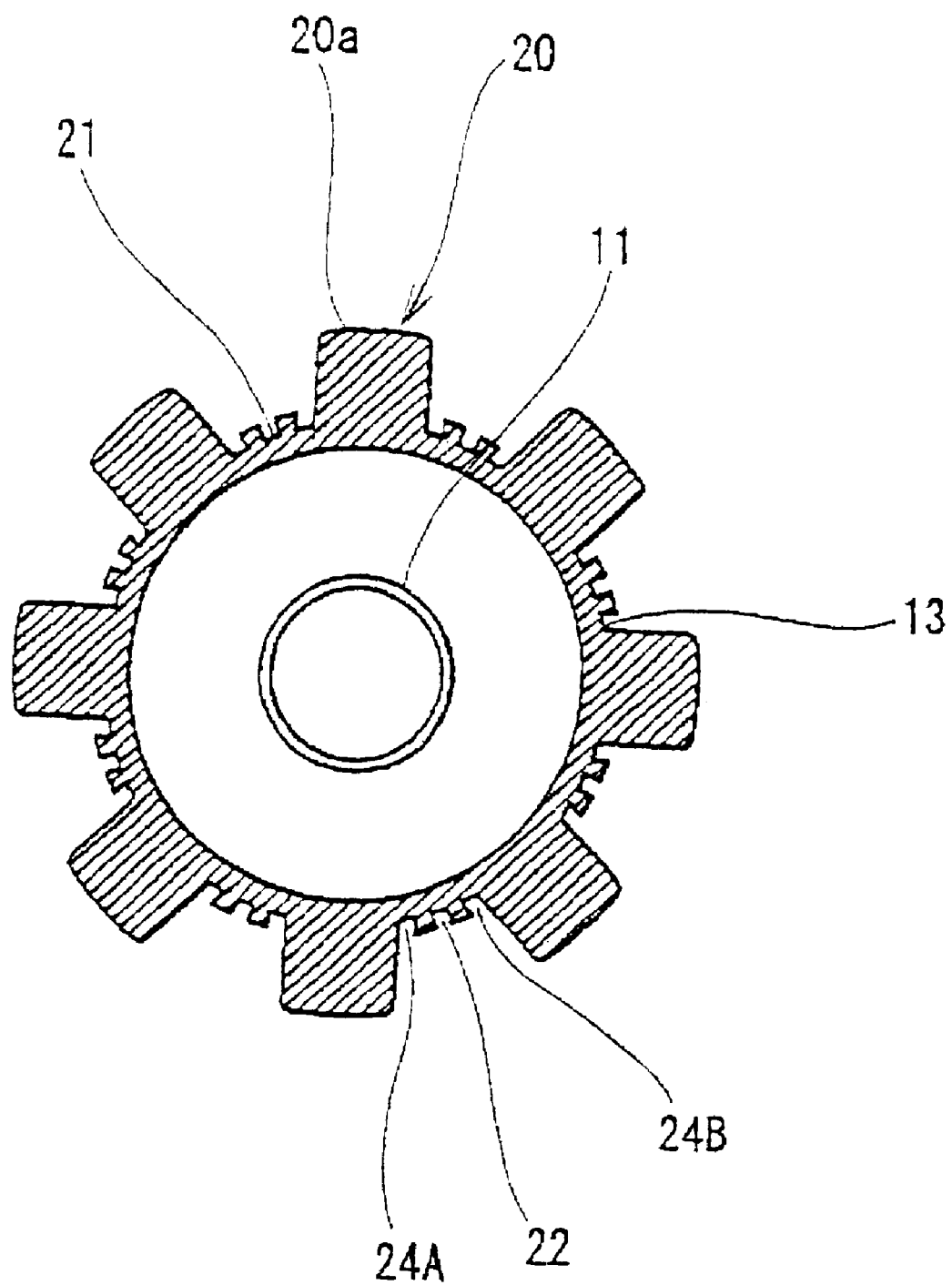
FIG. 5 is a cross-sectional view of the grommet shown in FIG. 2 taken along the line V—V of FIG. 2.

The embodiments of the present invention are explained in the following with reference to drawings.

FIGS. 1–9 illustrate a first embodiment of the present invention.

A grommet 10 is made of a suitable elastic material, such as an elastic or a elastomer, and is formed unitarily and in one piece. The grommet 10 includes a first small diameter cylindrical portion 11, which is positioned at the front side in an inserting direction, and a second small diameter cylindrical portion 12, which is positioned at the rear side of the inserting direction, and a tapered portion 13 extending between the first small diameter cylindrical portion 11 and the second small diameter cylindrical portion 12. The tapered portion 13 has a generally conical shape whose diameter is enlarged from an end connecting to the first small diameter cylindrical portion 11 to the other end, has a thickened portion around a large diameter end, and an automobile body engagement recess 14 on an outer peripheral surface thereof.

The side walls of the automobile body engagement recess 14 includes a vertical wall 14a, projecting outwardly and positioned around the large diameter end, a groove 14b and an inclined wall 14c that faces the vertical wall 14a across the groove 14b. The groove 14b has front and rear hollow portions 14d and 14e at the inner part thereof (note FIG. 6), as well as a lip 14h projecting from the groove bottom surface.

A plurality of outer projecting strip portions 20 are provided on the outer peripheral surface of the tapered portion 13. The plurality of outer projecting strip portions 20 are spaced from each other in a circumferential direction, and extend in the axial direction of the tapered portion 13 between a small diameter side, connecting to the small diameter cylindrical portion 11, and the large diameter side of the inclined wall 14c of the automobile body engagement recess 14c. The outer projecting strip portions 20 have a rib-shape, i.e., project from the outer peripheral surface of the tapered portion 13 to provide a thickened portion and a stepped shape.

In the present embodiment, eight outer projecting strip portions 20 extend in the axial direction between the small diameter end P1 and the large diameter end P2, and have a constant width in the circumferential direction throughout the axial direction. The eight outer projecting strip portions 20 have an identical shape.

In the present embodiment, the width W of each outer projecting strip portion 20 is about 10 mm, and the length L in the axial direction is about 14.8 mm. The outer diameter D of the outer projecting strip portion 20 at the edge of the inclined wall (position P2) is about 76 mm, and the outer diameter at the small diameter end (position P1) is about 63.9 mm. Of course, the above dimensions are merely exemplary, and any suitable dimensions may be utilized.

Figure 6:
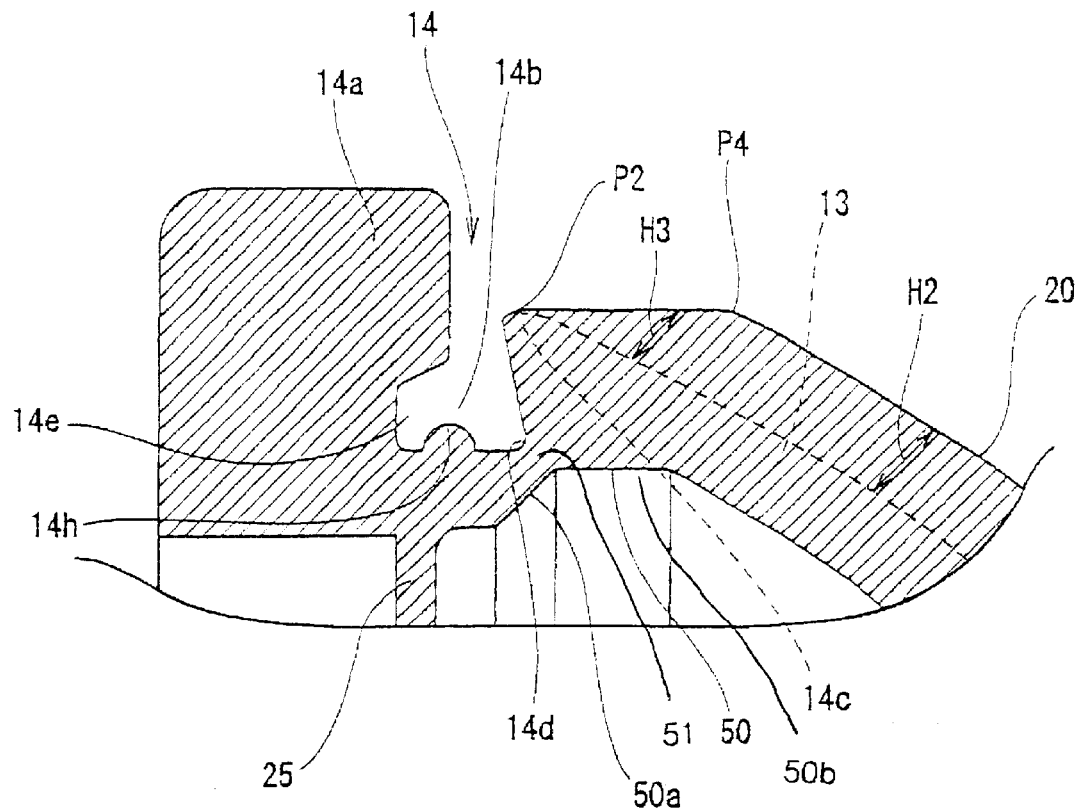
FIG. 6 is a partial enlarged view of the grommet shown in FIG. 2.
Figure 7:
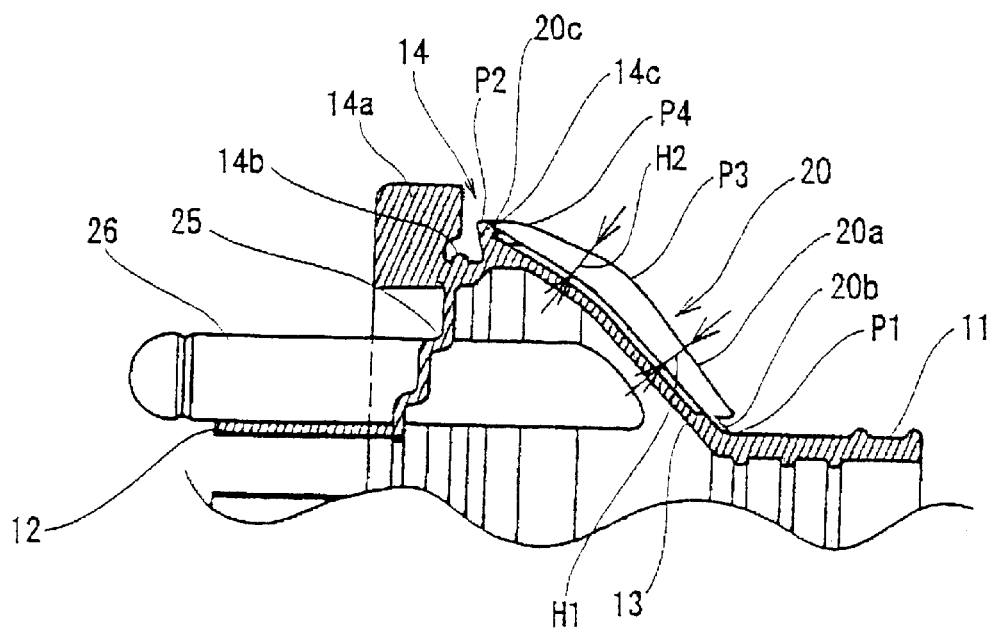
FIG. 7 is an enlarged view of a primary portion of the grommet shown in FIG. 6.

The projection amount H of the outer projecting strip portion 20 projecting from the outer peripheral surface of the tapered portion 13 is changed at the position of a contact point P3, which contacts an inner peripheral surface 30a of the through hole during the insertion of the grommet 10 into the through hole 30, so that the projection amount H2 between the contact point P3 and the position P2, which is the edge of the inclined wall, is smaller than the projection amount H1 between P3 and the small diameter end P1 (note FIG. 6).

Further, the outer peripheral surface 20a of the outer projecting strip portion 20 extends in parallel to the axial direction X of the grommet between the position P4 and the edge P2 of the inclined wall 14c (FIG. 6). At the position P4, the height of the outer surface 20a of the outer projecting strip portion 20 (from the axis) becomes the same as the height of the edge P2 (from the axis) of the inclined wall 14c.

As described above, the projection amount of each outer projecting strip portion 20 has a largest height H1 between P1 at the small diameter end and the small diameter side of the position P3. The projection amount H2 between P3 and P4 satisfies H1>H2. Thus, the outer surface 20a is bent. Further, the projection amount H3 between P4 and the edge P2 of the inclined wall 14c is less than H2 and decreases gradually.

Thus, the inclination angle θ of the outer surface 20a of each outer projecting strip portion 20 with the axis X changes between two levels, θ1 and θ2. At the small diameter cylindrical portion side, the inclination angle θ1 has the largest angle. At the contact point P4, the inclination angle θ2 is decreased. Further, at the position where the height of the outer surface 20a (from the axis) becomes the same as the height of the edge of the inclined wall 14c, the inclination angle is set to 0. Thus, the shape of the outer surface 20a changes by bending at three levels.

At the positions P3, and P4, where the angle is changed, the angle is changed by curving the edges smoothly so as not to generate a bump (a stepped portion).

Since the width of each outer projecting strip portion 20 is constant along the axis X, the outer projecting strip portions 20 are radially spread apart from the small diameter end P1 to the large diameter end P2. At the end portion 20b of the outer projecting strip portion 20 at the small diameter end P1, adjacent outer projecting strip portions 20 are arranged close to each other. At the end portion 20c of the outer projecting strip portion 20 at the large diameter side P2, adjacent outer projecting strip portions are spaced from each other. Accordingly, triangular sunken portions 21, which define the outer peripheral surface 13a of the tapered portion 13, are generated so as to be widened from the small diameter side to the large diameter side.

Further, a recess 50 is provided in the inner peripheral surface of the tapered portion 13 between the position P4 and the position P2 of the inclined wall 14c (note FIG. 6). As shown in FIG. 6, the recess 50 has a side surface 50a inclined toward the interior side of the groove 14b, and another side surface 50b connecting to the inner peripheral surface of the tapered portion 13. The depth of the recess 50 is determined such that the height of the bottom surface of the recess 50 (from the axis) is smaller than the height of the bottom surface of the groove 14b (from the axis), and a thinned portion 51 is formed between the groove 14b and the recess 50. The thinned portion 51 provides a fulcrum to easily bend the inclined wall 14c toward the interior of the groove 14b.

At the center in the circumferential direction of the sunken portion 21 between the outer projecting strip portions 20, a center groove 22 is provided. Further, outer side grooves 24A and 24B are provided along the proximal portion of the outer projecting strip portion 20. The outer side grooves 24A and 24B extend to P4, which is a periphery of the edge of the inclined portion (wall). The center groove 22 is shorter than the both of the outer side grooves 24A and 24B. In other words, an end of the center groove 22 does not extend toward the edge of the inclined portion (wall) over the ends of both the outer side grooves 24A and 24B. Due to these grooves 22, 24A and 24B, even if the stiffness of the tapered portion 13 is increased by providing the outer projecting strip portions 20 thereon, the tapered portion 13 can be easily bent (deformed) in a diameter reducing direction when the tapered portion 13 is being inserted into the through hole of the automobile body panel. In other words, the grooves 22, 24A and 24B guide the tapered portion 13 in a direction to fold the sunken portion 21 so that the tapered portion reduces the diameter thereof without unreasonable force.

At the end of the large diameter side of the above-described tapered portion 13, a thin end face portion 25 is provided, and the end face portion 25 is bent in a stepped shape so as to project to the center side. The second small-diameter cylindrical portion 12 extends outwardly from the center of the end face portion 25. Slits 12a are provided in the second small diameter cylindrical portion 12 so as to face each other. Thus, the small diameter cylindrical portion 12 is divided into two semi-cylindrical pieces 12b and 12c. In addition, the slits 12a connect to slits 25a provided in the end face portion 25.

As described above, by connecting the slits 12a and 25a, the thin end face portion 25 can follow the movement of each semi-cylindrical piece 12b, 12c.

The grommet 10 is further provided with two cable insertion cylindrical portions 26 to connect to optional components, such as a washer fluid tube, a Bowden cable, or an electrical cable separate from the wire harness. Each cable insertion cylindrical portion 26 includes an opening 26a in a sunken portion 21 of the outer peripheral surface of the tapered portion 13, passes through the interior of the tapered portion 13, and extends outwardly from the end face portion 25. The end of the extending portion 26b has a closed portion 26c. When a cable is to be inserted thereinto, the cutting portion 26d is cut to make an opening. Of course, cutting portion 26d may be formed as a frangible portion to be broken with a suitable force.

As shown in FIGS. 8(A)–8(C), the above-described grommet 10 first engages around the wire harness W/H, and then, the grommet 10 is mounted into the through hole 30 of the automobile body panel P, which is a dash panel dividing the outside (Y) of the passenger compartment from the passenger compartment side (Z).

A mounting operation of the above-described grommet 10 is described hereinafter.

The first small diameter cylindrical portion 11 is pressed into the through hole 30 from the outside (Y) of the passenger compartment. At this time, if the grommet 10 is inclined, a portion of the outer projecting strip portions 20 touches the inner peripheral surface of the through hole 30 and contact resistance occurs. Accordingly, the operator corrects the inserting posture of the grommet 10.

In addition, since a plurality of outer projecting strip portions 20 are provided on the outer peripheral surface of the thin tapered portion 13, the stiffness of the tapered portion 13 increases. Accordingly, when the grommet 10 is inserted in an inclined posture, a portion of the tapered portion 13, which is in contact with the inner peripheral surface of the through hole, is positively prevented from being bent and deformed.

When the tapered portion 13 of the grommet 10 is being inserted into the through hole 30 and the contact point P3 of the outer projecting strip portions 20, where the inner diameter of the through hole 30 is equal to the outer diameter of the grommet 10, reaches the position of the through hole 30, the operator feels tactile sensation by the contact of the outer surface 20a of the outer projecting strip portions 20 with the inner peripheral surface of the through hole 30.

Figure 11:
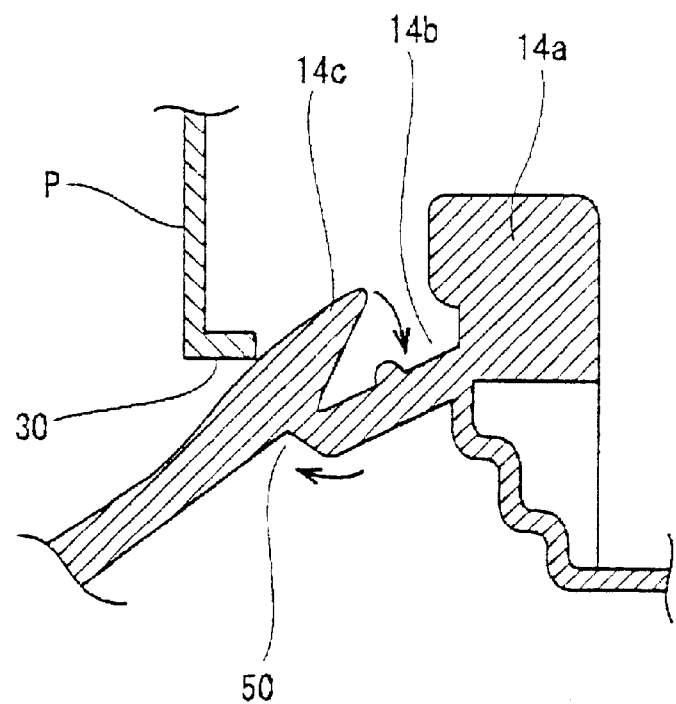
FIG. 11 is a partial cross-sectional view illustrating the deformation of the inclined wall at the time of inserting (pressing) the grommet into the through hole according to the first embodiment of the present invention.

From this moment, the operator presses the grommet 10 without stopping and inserts the grommet 10 into the through hole 30 by deforming the outer projecting strip portions 20. At this time, since the recess 50 is provided at the inner surface side of the inclined wall 14c (tapered portion 13), and the side surface 50a of the recess 50 is inclined to the interior side of the bottom surface of the groove 14b, the tapered portion 13 is deformed as shown in FIG. 11, and the inserting force of the grommet is decreased.

Figure 9:
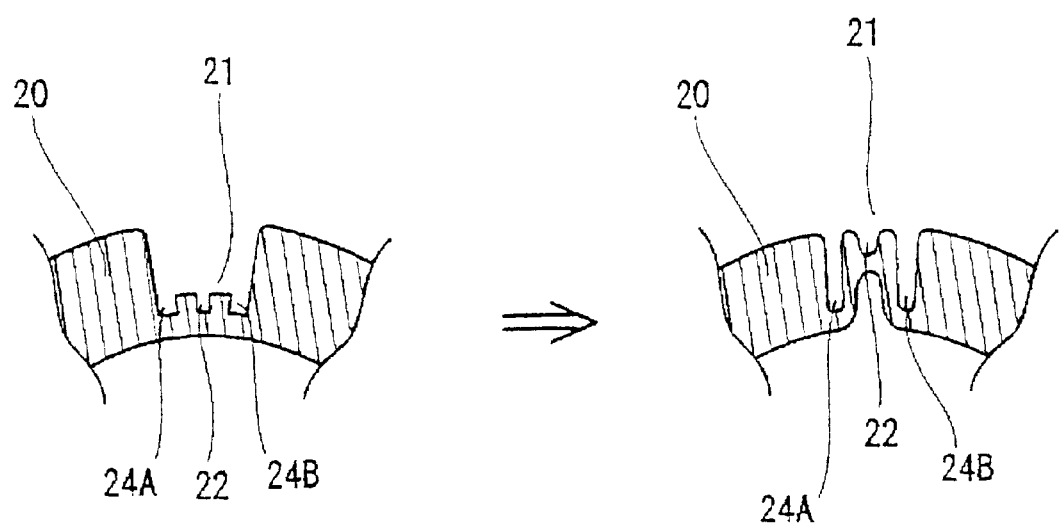
FIG. 9 is an enlarged partial cross-sectional view illustrating an action of the primary portions of the grommet according to the first embodiment of the present invention.

More in detail, as shown in FIG. 9, since the sunken portion 21 provided between the outer projecting strip portions 20 includes grooves 22, 24A and 24B, the sunken portion 21 is easily bent in the circumferential direction. Accordingly, the sunken portions 21 are deformed and bent to form an outwardly swollen ridge shape between adjacent outer projecting strip portions 20, which narrows the space therebetween while the diameter is being reduced. Thus, the tapered portion 13 having the outer projecting strip portions 20 can smoothly reduce the diameter thereof.

In addition, since the inclination angle of the outer projecting strip portion 20 is gentle and the projection amount from the outer peripheral surface of the tapered portion 13 is small, a strong pressing force is not required, and thus, the insertion of the grommet 10 can be performed with a low inserting force.

Further, when the outer surface 20a of the outer projecting strip portion 20 reaches the same height as that of the edge of the inclined wall 14a of the automobile body engagement recess 14, from this position P4, the outer surface 20a of the outer projecting strip portions 20 become parallel to the axial direction, and guides the edge of the inclined wall to pass through the through hole 30 in a straight posture.

As described above, the outer surface 20a of the outer projecting strip portions 20 is pressed by the inner peripheral surface of the through hole 30, and the edge of the inclined wall 14c is forced to pass through the through hole 30 while the diameter of the tapered portion 13 is reduced.

When the inclined wall 14c has passed through the through hole 30, the original position (shape) is elastically recovered, and the peripheral edge portion of the through hole 30 is pressed into the groove 14b between the inclined wall 14c and the vertical wall 14a. In this condition, the facing surfaces of the inclined wall 14c and the vertical wall 14a are pressed toward each other and contact opposite surfaces of the automobile body panel P, and the inner peripheral surface of the through hole 30 is pressed into contact with the lip 14h projecting from the groove bottom surface. Thus, the grommet 10 engages with the through hole 30 of the automobile body panel P in a sealing condition.

As described above, since the grommet 10 has the outer projecting strip portions 20 on the outer peripheral surface of the tapered portion 13, the operator can correct an inclined insertion posture, the thin tapered portion is reinforced, and bending, which easily occurs at the time of inclined insertion, can be prevented. Thus, even if the grommet 10 is inserted in an inclining posture, the grommet 10 is not prevented from being inserted into the through hole 30.

Further, at the periphery of the edge of the inclined wall 14c, the outer projecting strip portions guide the inclined wall 14c to pass through the through hole 30 in a straight manner. Accordingly, deformation does not occur at the periphery of the edge of the inclined wall, and thus, the inclined wall can pass through the through hole 30 smoothly.

Furthermore, since the recess 50 is provided, and the grooves 22, 24A and 24B are provided so that each sunken portion 21 between the outer projecting strip portions 20 is folded, the diameter of the tapered portion 13 can be equally reduced in the circumferential direction during installation, and the grommet 10 can engage with the through hole of the automobile body panel with a small inserting force.

In addition, after the grommet 10 is mounted on the automobile body panel, even when the wire harness is pulled and a force occurs in a direction to which the grommet is removed from the panel, from the small diameter cylindrical portion 11 side, since the second small diameter cylindrical portion is fixed to the wire harness by tape wrapping to resist the force pulling the wire harness, the grommet 10 is prevented from being removed from the panel.

At that time, in particular, since the second small-diameter portion 12 and the thin end face portion 25 connecting thereto have the slits 12a and 25a, even if the force pulling the wire harness is applied from any direction, the grommet 10 is prevented from being separated from the automobile body panel by resisting the force.

Figure 10A:
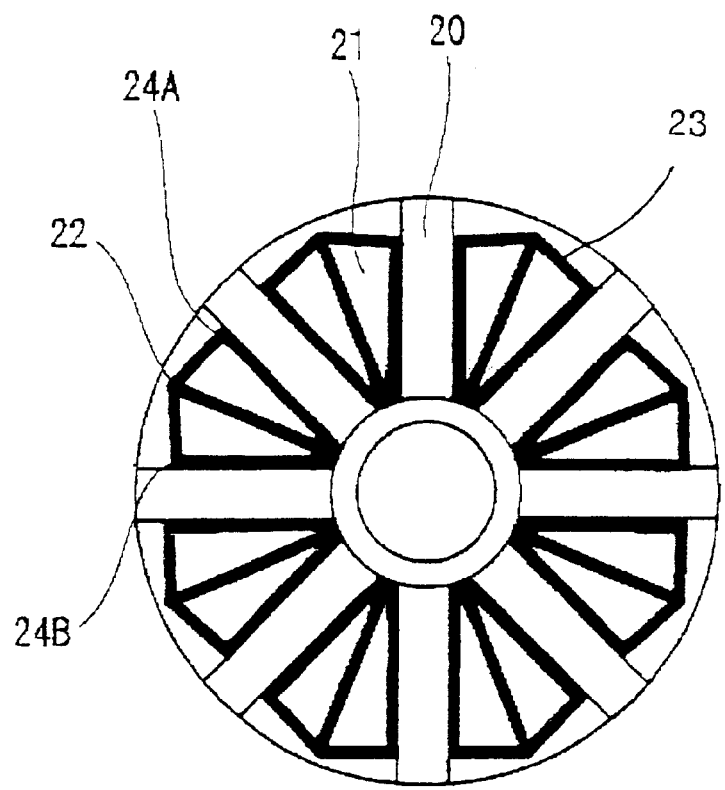
FIGS. 10(A), 10(B) and 10(C) are views illustrating modified examples of grooves in the grommet according to the first embodiment.
Figure 10B:
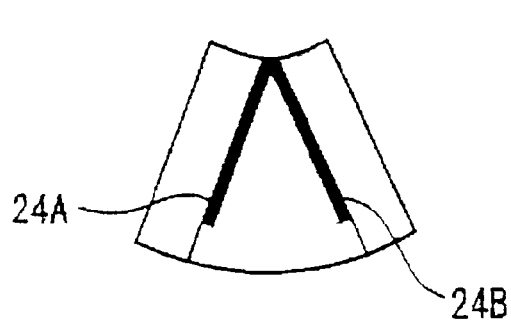
Figure 10C:
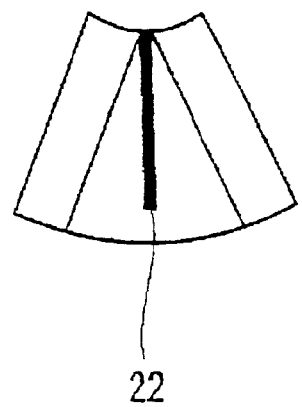

FIGS. 10(A), 10(B) and 10(C) show modified examples of the grooves provided on the sunken portion 21. In FIG. 10(A), V-shaped grooves 23 extend between an end of the center groove 22 at the center in the circumferential direction and ends of two grooves 24A and 24B extending along the proximal portion of the outer projecting strip portions 20. When the groove 23 is provided, the sunken portion 21 is easily bent by moving the center groove 22 and both the side grooves 24A and 24B, cooperatively.

In FIG. 10(B), only the two grooves 24A and 24B are provided at the proximal portions of the outer projecting strip portions 20.

In FIG. 10(C), only one groove 22 is provided at the center of the sunken portion 21 in the circumferential direction.

Thus, even if the number of the grooves provided in the sunken portion 21 is changed, the grommet can be easily bent in the diameter reducing direction.

Figure 12:
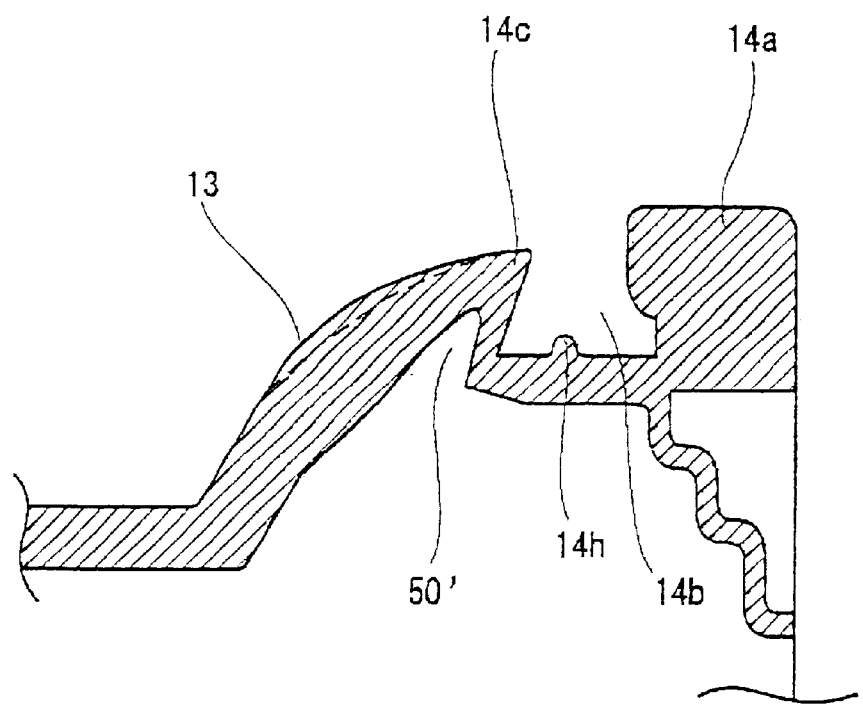
FIG. 12 is an enlarged partial cross-sectional view illustrating the primary portion of a grommet according to a second embodiment of the present invention.
Figure 13:
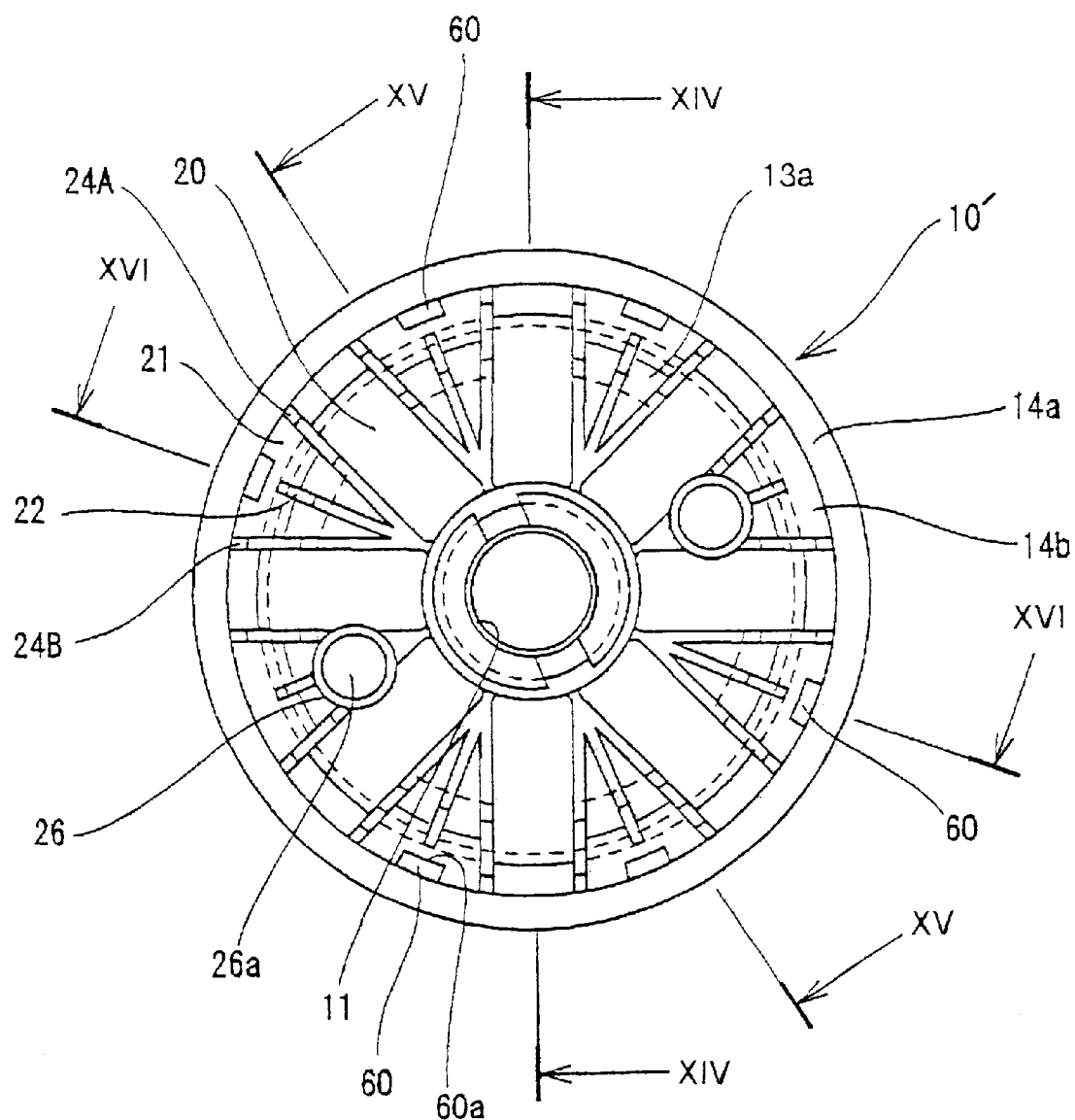
FIG. 13 is a front view of a grommet according to a third embodiment of the present invention.
Figure 14:
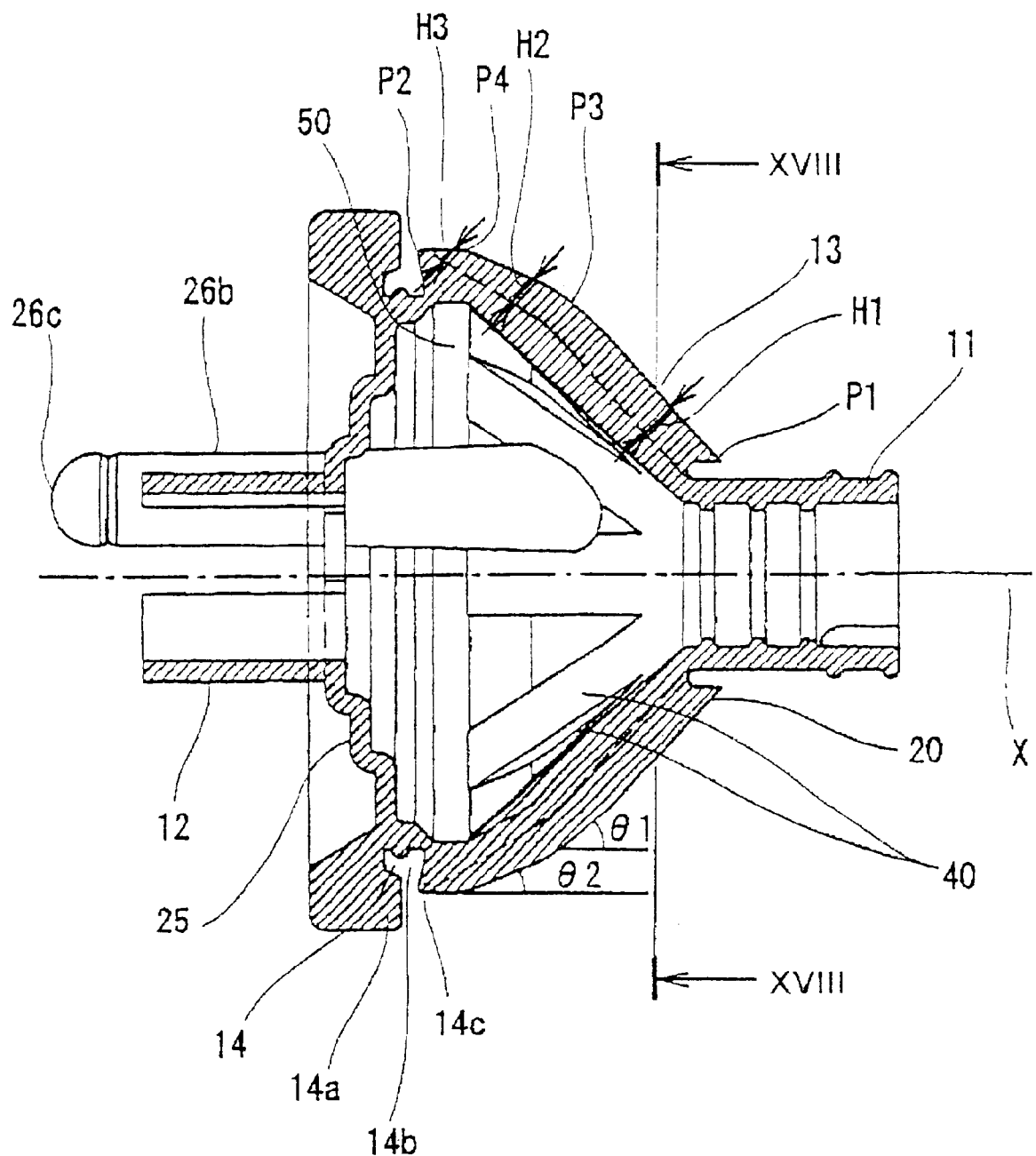
FIG. 14 is a cross-sectional view of the grommet shown in FIG. 13 taken along the line XIV—XIV of FIG. 13.
Figure 15:
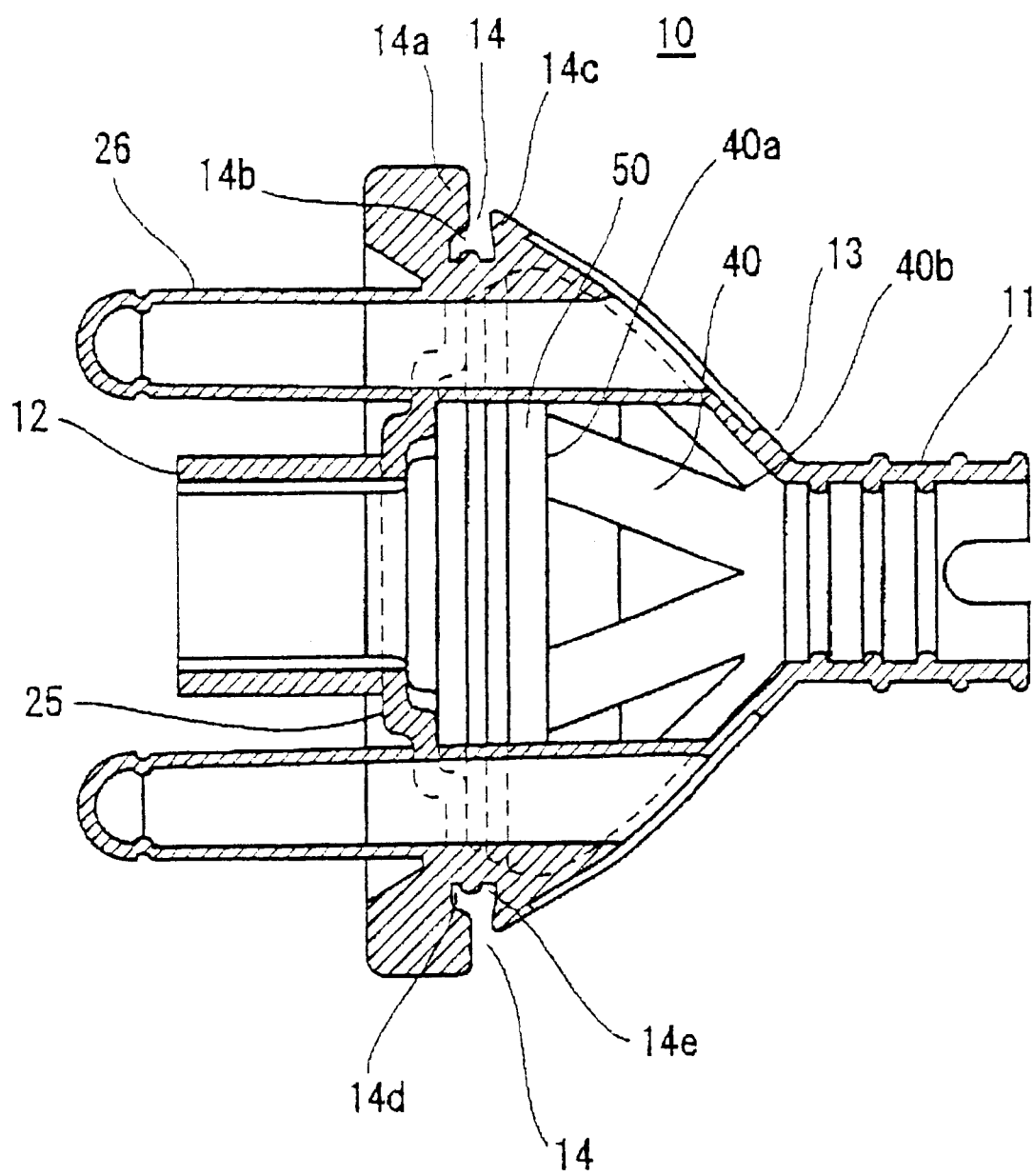
FIG. 15 is a cross-sectional view of the grommet shown in FIG. 13 taken along the line XV—XV of FIG. 13.
Figure 16:
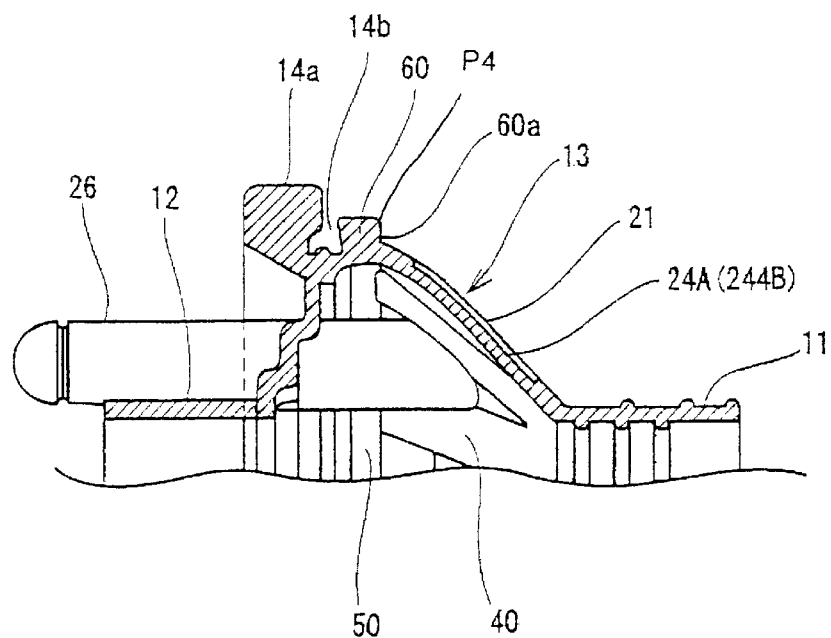
FIG. 16 is a cross-sectional view of the grommet shown in FIG. 13 taken along the line XVI—XVI of FIG. 13.

FIG. 12 shows a second embodiment of the present invention. In the second embodiment, a V-shaped recess 50' is provided on the interior of the inclined wall 14c (tapered portion 13), so that the recess 50' has an approximately similar shape to the outline of the inclined wall 14c. If the recess 50' has this shape, the entire inclined wall 14c can be thinned, and the inserting force of the grommet into the through hole of the panel can be further reduced.

In addition, even if the recess 50' is provided on the interior of the inclined wall 14c to decrease the grommet inserting force, since the second small diameter cylindrical portion 12 is fixed to the wire harness, the grommet is prevented from being separated from the panel.

FIGS. 13–20(C) show a third embodiment of the present invention.

A grommet 10' is made of any suitable elastic material, such as an elastic or an elastomer, and is formed unitarily and in one piece. The components of the grommet 10', which are the same as those of the first embodiment, are given the same reference numerals, and detailed explanation is omitted.

Figure 19:
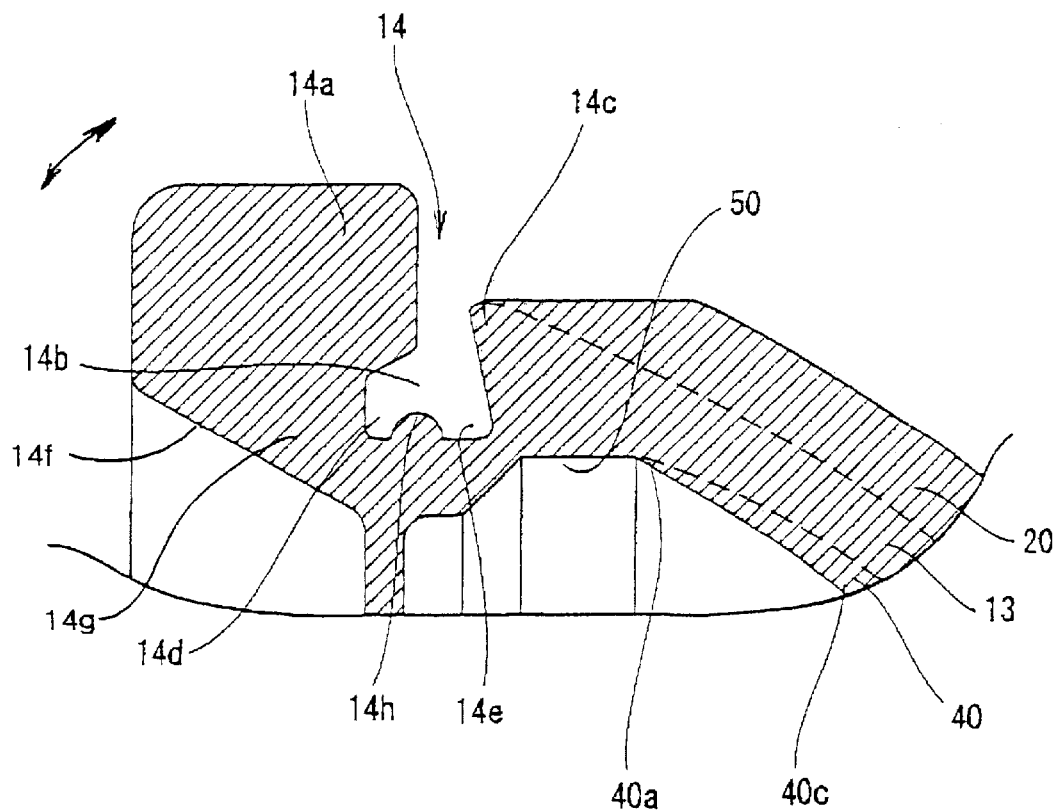
FIG. 19 is a partial enlarged view of the grommet shown in FIG. 14.

In this embodiment, as shown in FIG. 19, the vertical wall 14a has a reduced portion 14f in the inner peripheral side at the rear end so that the inner peripheral surface of the vertical wall 14a is inclined. The vertical wall 14a opposing the bottom surface of the groove is slightly thinned at the proximal portion 14g. Thus, the thick vertical wall 14b can be deformed so as to pivot upon the base portion 14g in a direction shown by an arrow in FIG. 19.

In this embodiment, a small stepped portion 60 (FIG. 13) extends from the edge of the inclined wall 14c, spaced from the center groove 22, toward the small diameter cylindrical portion side. The small stepped portion 60 has the same height as that of the edge of the inclined portion 14c to the point P4, and the end face 60a is raised above the sunken portion 21. The outer side grooves 24A and 24B are located at both sides of the small stepped portion 60, so that the small stepped portion can easily bend.

In addition, inner projecting strip portions 40 are provided on the inner peripheral surface of the tapered portion 13 so as to oppose the outer projecting strip portions 20. Triangular sunken portions 41 are located between inner projecting strip portions 40.

Similar to the first embodiment, a recess 50 is also provided in the inner peripheral surface of the tapered portion 13 to have a thinned portion from the proximal position of the automobile body engagement recess 14 to the inclined wall 14c side. The end 40a of the inner projecting strip portion 40 is located at the recess 50. The inner projecting strip portion 40 projects from the curvedly sunken inner peripheral surface of the tapered portion 13, and extends between the proximal end of the small diameter end side 40b and the end 40a, so that the inner surface 40c of the inner projecting strip portions 40 forms a generally straight (planar) surface.

Figure 17:
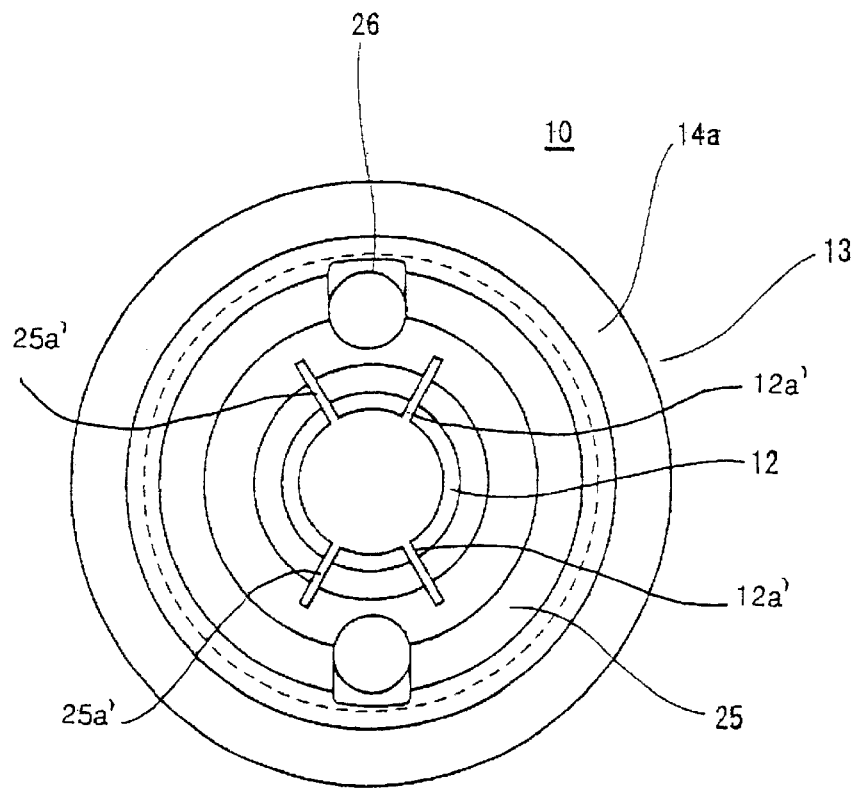
FIG. 17 is a left side view of the grommet according to the third embodiment of the present embodiment.
Figure 18:
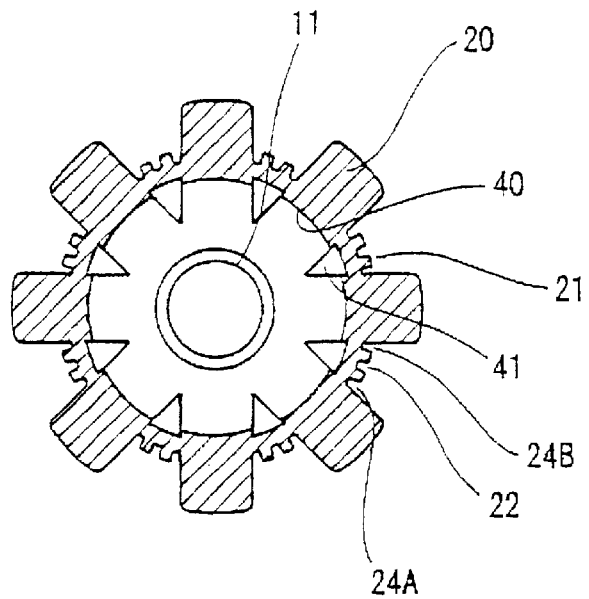
FIG. 18 is a cross-sectional view of the grommet shown in FIG. 14 taken along the line XVIII—XVIII of FIG. 14.

Similar to the first embodiment, at the end of the large diameter side of the above-described tapered portion 13, a thin end face portion 25 is provided. The second small diameter cylindrical portion 12 extends outwardly from the center of the end face portion 25. In this embodiment, as shown in FIG. 17, two pairs of slits 12a' are provided in the second small diameter cylindrical portion 12. Each pair face each other. The slits 12a' connect to slits 25a' provided in the end face portion 25.

The grommet 10' is further provided with two cable insertion cylindrical portions 26 to connect to optional parts. Each cable insertion cylindrical portion 26 includes an opening 26a in the sunken portion 21 of the outer peripheral surface of the tapered portion 13, passes through the interior of the tapered portion 13, and extends outwardly from the end face portion 25. The end of the projecting portion 26b has a closed portion 26c. When a cable is to be inserted thereinto, the cutting (or frangible) portion 26d is cut to make an opening.

Figure 20A:
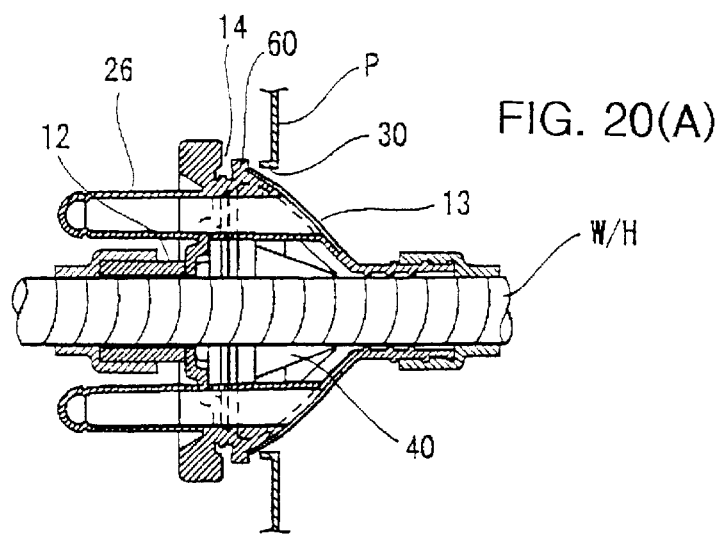
FIGS. 20(A), 20(B) and 20(C) are views illustrating the grommet of the third embodiment, being inserted into a through hole.
Figure 20B:
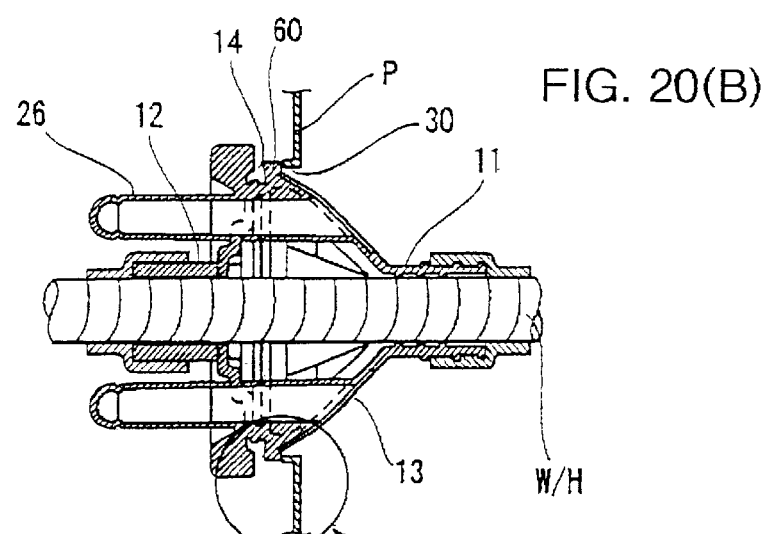
Figure 20C:
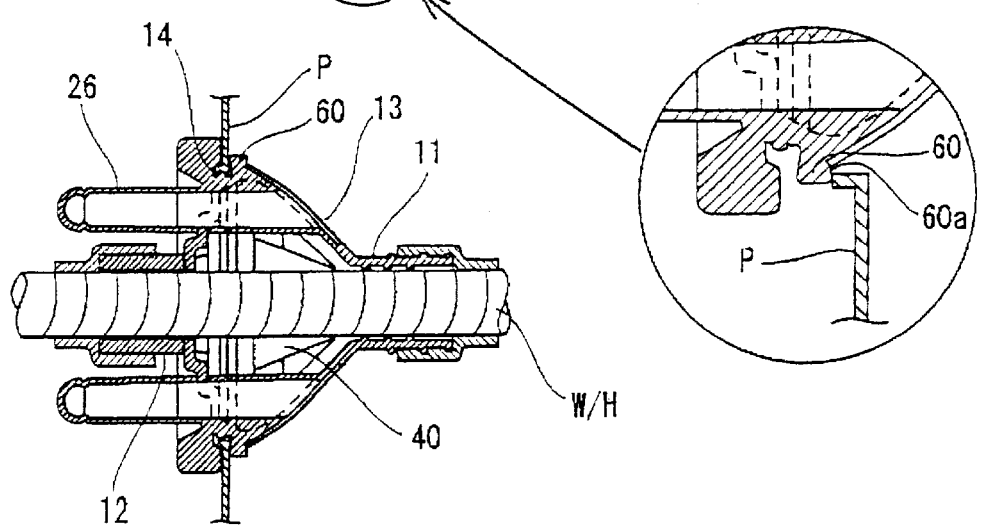
Figure 21:
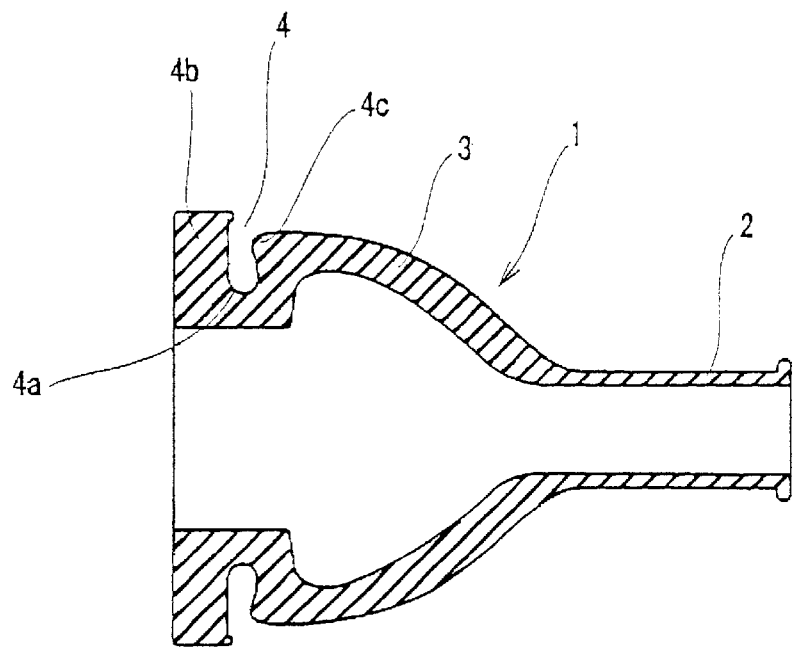
FIG. 21 is a cross-sectional view of a conventional grommet.
Figure 22:
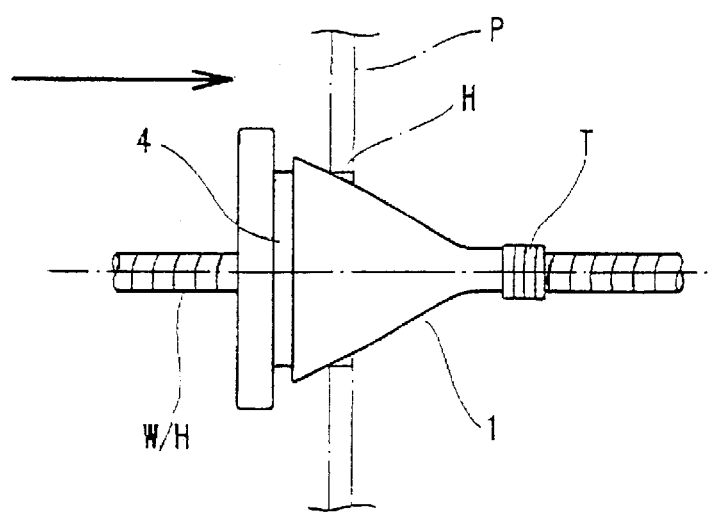
FIG. 22 is a view illustrating an example of an insertion operation of the conventional grommet of FIG. 21 into the through hole of an automobile body panel.
Figure 23:
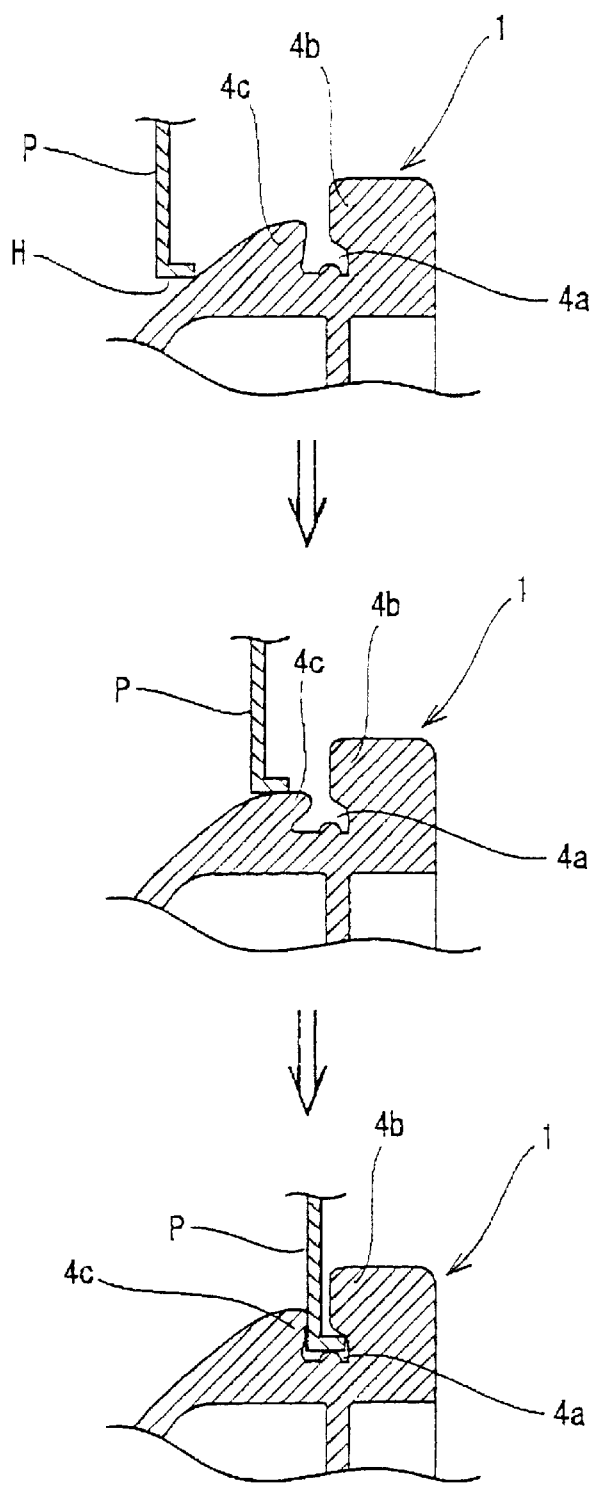
FIG. 23 is a view illustrating a problem of the conventional grommet.

As shown in FIGS. 20(A)–20(C), the above-described grommet 10' engages around the wire harness W/H, and then, the grommet 10' is mounted into the through hole 30 of the automobile body panel P, which is a dash panel dividing the outside (Y) of the passenger compartment from the passenger compartment side (Z).

A mounting operation of the above-described grommet 10' is described hereinafter.

The first small diameter cylindrical portion 11 is pressed and inserted into the through hole 30 from the outside (Y) of the passenger compartment. At this time, if the grommet 10' is inclined, a portion of the outer projecting strip portions 20 touches the inner peripheral surface of the through hole 30 and contact resistance occurs. Accordingly, the operator corrects the inserting posture of the grommet 10'.

In addition, since a plurality of outer projecting strip portions 20 and a plurality of inner projection strip portions 40 are respectively provided on the outer peripheral surface and the inner peripheral surface of the thin tapered portion 13, the stiffness of the tapered portion 13 increases. Accordingly, when the grommet 10' is inserted in an inclining posture, a portion of the tapered portion 13, which is in contact with the inner peripheral surface of the through hole, is positively prevented from being bent and deformed.

The tapered portion 13 of the grommet 10' is inserted and pressed into the through hole 30.

At the time of the pressing operation, as shown in FIG. 20(b), the small stepped portion 60 for tactile sensation provided on the tapered portion 13 contacts the periphery of the through hole 30 of the automobile body, and gives the operator tactile sensation.

When the tactile sensation is felt, since the outer projecting strip portions 20 have the same height (from the axis) as that of the edge of the inclined wall 14c, a larger inserting force is required. However, when the operator concentrates his strength and presses the grommet into the through hole without stopping, the grommet can pass through the through hole smoothly. At the time of the pressing operation, since the outer side grooves 24A and 24B are located at both sides of the small stepped portion 60, the sunken portion 21 and the small stepped portion 60 are easily bent. Further, since the inclination angle of the outer projecting strip portions 20 is gentle and the projection amount from the outer peripheral surface of the tapered portion 13 is small, a large pressing force is not required and the pressing can be performed with a low inserting force.

Further, when the outer projecting strip portions are pressed and bent inwardly to be deformed, the thick vertical wall 14a swings about the proximal portion 14g as a fulcrum to follow the deformation of the tapered portion 13. Thus, the reduction of the insertion force can be enhanced.

Further, when the outer surface of the outer projecting strip portion 20 reaches the same height as that of the edge of the inclined wall 14c of the automobile body engagement recess 14, from the position P4, the outer surface of the outer projecting strip portions 20 becomes a straight line in parallel with the axial direction, and guides the grommet so that the edge of the inclined wall passes through the through hole 30 in a straight posture.

As described above, the outer surface 20a of the eight outer projecting strip portions 20 is pressed by the inner peripheral surface of the through hole 30, and the edge of the inclined wall 14c is forced to pass through the through hole 30 while the diameter of the tapered portion 13 is reduced.

When the inclined wall 14c passes through the through hole 30, the original position (shape) is elastically recovered, and the peripheral edge portion of the through hole 30 is pressed into the groove 14b between the inclined wall 14c and the vertical wall 14a. In this condition, the facing surfaces of the inclined wall 14c and the vertical wall 14a are pressed toward and contact opposite surfaces of the automobile body panel P, and the inner peripheral surface of the through hole 30 is pressed into contact with the lip 14h projecting from the groove bottom surface. Thus, the grommet 10' engages with the through hole 30 of the automobile body panel P in a sealing condition.

As described above, since the grommet 10' has the small stepped portion 60 for tactile sensation on the outer peripheral surface of the tapered portion 13, the operator can clearly recognize the position where he must concentrate the strongest forces and press the grommet without stopping. Thus, the grommet 10' can be mounted into the through hole 30 of the automobile body without using needless (extra) energy.

In addition, similar to the first embodiment, since the grommet 10' has the outer projecting strip portions 20, the operator can correct an inclined insertion posture. The thin tapered portion is reinforced by the outer and inner projecting strip portions 30 and 40. Bending, which is likely to occur at the time of inclined insertion, can be prevented. Thus, even if the grommet 10' is inserted in an inclining posture, the grommet 10' is not prevented from being inserted into the through hole 30.

Further, at the periphery of the edge of the inclined wall 14c, the outer projecting strip portions 20 and the small stepped portion 60 guide the grommet 10' so that the inclined wall 14c passes though the through hole 30 in a straight manner. Accordingly, deformation does not occur at the periphery of the edge of the inclined wall, and thus, the inclined wall can passes through the through hole 30 smoothly.

Furthermore, since the inner projecting strip portions 40 and the outer projecting strip portions 20 maintain the stiffness of the tapered portion 13, the extension of the grommet 10' at the time of pressing and inserting can be suppressed and the insertion stroke can be shortened.

The present invention is not limited to the embodiments described above. The number of the outer and inner projecting strip portions is not limited to eight, rather, it can be equal to or more than four, and equal to or less than ten are available. Thus, the number can be suitably determined based upon the relationship with thickness of the inner and outer projecting strip portions. Further, when, in particular, the small stepped portion (for tactile sensation) is provided, the outer peripheral surface of the outer projecting strip portion can have a smooth curved shape, rather than the changes in the angles of inclination as described above.

The second small diameter cylindrical portion provided at the large diameter side of the tapered portion can be removed. However, considering the separation of the grommet from the automobile body panel after the grommet is mounted into the through hole of the automobile body panel, it is preferable to have the second small diameter cylindrical portion and to fix the second small diameter cylindrical portion to the wire harness by taping.

Further, the cable insertion cylindrical portion for the option parts is not always required to be provided.

In addition, needless to say, the through hole can have an oval shape and a grommet having the tapered portion with an oval shape cross section can also be used. Any other suitable complementary shapes for the through hole and the grommet may be utilized, as will be apparent to those skilled in the art.

As clearly described above, since the grommet of the present invention has grooves extending in the axial direction and spaced from each other in the circumferential direction, on the outer peripheral surface of the tapered portion, the grommet can be bent easily. Accordingly, when the grommet is inserted in an inclining posture, the posture is easily corrected to a regular posture.

Further, since the grommet of the present invention has a recess in the inner surface of the inclined wall, which is pressed into the through hole of the panel, the inclined wall can be easily bent toward the groove. Thus, the inserting force of the grommet can be decreased.

In addition, while the inserting force of the grommet is decreased, the second small diameter cylindrical portion is provided and fixed to the wire harness by taping. Accordingly, the separation of the grommet from the panel can also be prevented.

Further, the grommet of the present invention has small stepped portions for tactile sensation projecting from the edge of the inclined wall on the outer peripheral surface of the tapered portion. Accordingly, the operator can recognize the position where the operator must concentrate his strength and presses the grommet into the through hole without stopping, and thus, the operability can be improved.

Further, the outer projecting strip portions project from the outer peripheral surface of the tapered portion to extend in the axial direction and to be spaced from each other in the circumferential direction. Accordingly, when the grommet is inserted in an inclining posture, since the projecting strip portions touch the inner peripheral surface of the through hole, an operator can be aware of the inclined insertion and correct the insertion posture. Further, when one side of the tapered portion of the grommet touches the inner peripheral surface of the through hole due to the inclined insertion, since the outer projecting strip portions increase the stiffness of the tapered portion, the case in which the tapered portion bends and cannot be inserted, does not occur.

In addition, if the outer projecting strip portions and the inner projecting strip portions are provided at an identical position (opposing to each other), and the sunken portion is provided between adjacent inner/outer projecting strip portions, the stiffness is increased, and at the same time, bending of the sunken portion in a diameter reducing direction is secured. Accordingly, the operability of insertion of the grommet into the through hole is not decreased.

In particular, if the outer projecting strip portions and grooves in the sunken portions between the projecting strip portions are provided on the outer peripheral surface of the tapered portion of the grommet, the diameter of the tapered portion can be smoothly reduced.

Further, if the projection amount of the projecting strip portions is reduced from the position where the projecting strip portions contact the inner peripheral surface of the through hole, the grommet can be inserted into and engages with the through hole with a small inserting force.

At this time, the inclination angle of the outer surface of the outer projecting strip portions is changed at the position where the outer projecting strip portions contact the inner peripheral surface of the through hole so that the operator feels tactile sensation. Accordingly, when the grommet is pressed without stopping from this position, the grommet mounting operation becomes efficient.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Applications No. 2000-288700, filed on Sep. 22, 2000, No. 2001-017542, filed on Jan. 25, 2001, No. 2001-017556, filed on Jan. 25, 2001 and No. 2001-017643, filed on Jan. 25, 2001, which are herein expressly incorporated by reference in its entirety.

What is claimed is:

1. A grommet configured to engage around an outer periphery of a wire harness and to be mounted in a through hole of an automobile body panel, the grommet comprising:

a tubular portion;

a tapered portion extending from one end of the tubular portion, the tapered portion including an automobile body engagement recess provided on an outer peripheral surface of the tapered portion to engage with the automobile body panel;

the recess being formed by a first wall provided around the tapered portion at a large diameter end and a second wall provided around the tapered portion and located at a small diameter side of the first wall, the second wall facing the first wall across the recess;

a plurality of projections provided on an outer peripheral surface of the tapered portion, the plurality of projections extending in an axial direction of the tapered portion and being spaced from each other in a circumferential direction, the plurality of the projections being arranged close to each other at a small diameter side of the tapered portion and being radially spread apart toward a large diameter side; and a sunken portion comprising the outer peripheral surface of the tapered portion between adjacent projections, the sunken portion including at least one groove extending in the axial direction.

2. The grommet according to claim 1, wherein each groove extends in a direction between the tubular portion and an edge of the second wall.

3. The grommet according to claim 1, wherein an outwardly extending lip portion is provided at a bottom of the recess between the first and second walls.

4. The grommet according to claim 1, further comprising an auxiliary member insertion portion provided between at least one pair of projections and configured to receive an auxiliary member, including one of a washer fluid tube, a Bowden cable, and an electrical cable separate from the wire harness.

5. The grommet according to claim 1, further comprising a step portion provided on one of at least one projection and at least one sunken portion.

6. The grommet according to claim 1, wherein a projection amount of the plurality of projections is changed at a contact point so that a first projection amount between the contact point and an edge of the second wall is smaller than a second projection amount between the contact point and a small diameter side end of the plurality of projections, the contact point being located substantially at a position where an outer surface of the plurality of projections first contacts an inner peripheral surface of the through hole when the grommet is inserted into the through hole from the end of the grommet having the tubular portion.

7. The grommet according to claim 6, wherein each groove in the sunken portion includes at least one of a center groove and two side grooves, the center groove being located at the center of the sunken portion in the circumferential direction, the two side grooves being located adjacent the plurality of projections.

8. A grommet configured to engage around an outer periphery of a wire harness and to be mounted in a through hole of an automobile body panel, the grommet comprising:

a tubular portion;

a tapered portion extending from one end of the tubular portion, the tapered portion including an automobile body engagement recess provided on an outer peripheral surface of the tapered portion to engage with the automobile body panel;

the recess being formed by a first wall provided around the tapered portion at a large diameter end and a second wall provided around the tapered portion and located at a small diameter side of the first wall, the second wall facing the first wall across the recess; and a plurality of projections provided on an outer peripheral surface of the tapered portion, the plurality of projections extending in an axial direction of the tapered portion and being spaced from each other in a circumferential direction;

the tapered portion further including an inner recess in an inner peripheral surface of the tapered portion, the inner recess being located at an inner surface side of the second wall, so that the inner recess is provided at least at locations corresponding to, and opposite from, locations of the plurality of projections, wherein the plurality of projections extend between a small diameter end, connecting to the tubular portion, and an edge of the second wall, and wherein a projection amount of the plurality of projections is changed at a contact point so that a first projection amount between the contact point and the edge of the second wall is smaller than a second projection amount between the contact point and a small diameter side end of the plurality of projections, the contact point being located substantially at a position where an outer surface of the plurality of projections first contacts an inner peripheral surface of the through hole when the grommet is inserted into the through hole from the end of the grommet having the tubular portion.

9. The grommet according to claim 8, wherein at least one of the plurality of projections has a constant width in the circumferential direction along the axial direction, and wherein the plurality of the projections are arranged close to each other at a small diameter side of the tapered portion and are radially spread apart at a large diameter side so as to define at least one sunken portion, comprising the outer peripheral surface of the tapered portion, between adjacent projections, and wherein the sunken portion includes at least one groove extending in the axial direction.

10. The grommet according to claim 8, wherein the inner recess comprises a V-shaped recess in an inner peripheral surface of the tapered portion at an inner surface side of the second wall.

11. The grommet according to claim 10, wherein the V-shaped recess has a shape substantially similar to an outline of the second wall so as to make the second wall thin.

12. A grommet configured to engage around an outer periphery of a wire harness and to be mounted in a through hole of an automobile body panel, the grommet comprising:

a first tubular portion;

a tapered portion extending from one end of the tubular portion, the tapered portion including an automobile body engagement recess provided on an outer peripheral surface of the tapered portion to engage with the automobile body panel;

the recess being formed by a first wall provided around the tapered portion at a large diameter end and a second wall provided around the tapered portion and located at a small diameter side of the first wall, the second wall facing the first wall across the recess;

a plurality of projections provided on an outer peripheral surface of the tapered portion, the plurality of projections extending in an axial direction of the tapered portion and being spaced from each other in a circumferential direction;

a thin end face portion provided at an end of the large diameter side of the tapered portion; and a second tubular portion extending outwardly from the center of the end face portion, the second tubular portion configured to receive at least one fixing element that fixes the second generally tubular portion to the wire harness, wherein the second tubular portion includes at least a pair of slits facing each other so that the second generally tubular portion is divided into at least two partial tubular portions.

13. A grommet configured to engage around an outer periphery of a wire harness and to be mounted in a through hole of an automobile body panel, the grommet comprising:

a first tubular portion;

a tapered portion extending from one end of the tubular portion, the tapered portion including an automobile body engagement recess provided on an outer peripheral surface of the tapered portion to engage with the automobile body panel;

the recess being formed by a first wall provided around the tapered portion at a large diameter end and a second wall provided around the tapered portion and located at a small diameter side of the first wall, the second wall facing the first wall across the recess;

a plurality of projections provided on an outer peripheral surface of the tapered portion, the plurality of projections extending in an axial direction of the tapered portion and being spaced from each other in a circumferential direction;

a thin end face portion provided at an end of the large diameter side of the tapered portion; and a second tubular portion extending outwardly from the center of the end face portion, the second tubular portion configured to receive at least one fixing element that fixes the second generally tubular portion to the wire harness, wherein the plurality of projections extend in a direction between a small diameter end, connected to the first tubular portion, and an edge of the second wall, and wherein a projection amount of the plurality of projections is changed at a contact point so that a first projection amount between the contact point and the edge of the second wall is smaller than a second projection amount between the contact point and a small diameter side end of the plurality of projections, the contact point being located substantially at a position where an outer surface of the plurality of projections first contacts an inner peripheral surface of the through hole when the grommet is inserted into the through hole from the end of the grommet having the first tubular portion.

14. The grommet according to claim 13, wherein at least one of the plurality of projections has a constant width in the circumferential direction along the axial direction, and wherein the plurality of projections are arranged close to each other at a small diameter side of the tapered portion and are radially spread apart at a large diameter side so as to define at least one sunken portion, comprising the outer peripheral surface of the tapered portion, between adjacent projecting strip portions, and wherein the sunken portion includes at least one groove extending the axial direction.

15. A grommet configured to engage around an outer periphery of a wire harness and to be mounted in a through hole of an automobile body panel, the grommet comprising:

a first tubular portion;

a tapered portion extending from one end of the tubular portion, the tapered portion including an automobile body engagement recess provided on an outer peripheral surface of the tapered portion to engage with the automobile body panel;

the recess being formed by a first wall provided around the tapered portion at a large diameter end and a second wall provided around the tapered portion and located at a small diameter side of the first wall, the second wall facing the first wall across the recess;

a thin end face portion provided at an end of the large diameter side of the tapered portion; and a second tubular portion extending outwardly from the center of the thin end face portion, the second tubular portion configured to receive at least one fixing element that fixes the second generally tubular portion to the wire harness;

the tapered portion further including an inner recess in an inner peripheral surface of the tapered portion, the inner recess being located at an inner surface side of the second wall, wherein the second tubular portion includes a pair of slits facing each other so that the second general cylindrical portion is divided into two generally half-cylindrical portions.

16. The grommet according to claim 15, further comprising a plurality of projecting strip portions provided on an outer peripheral surface of the tapered portion, the plurality of projecting strip portions extending in an axial direction of the tapered portion and being spaced from each other in a circumferential direction.

17. A grommet configured to engage around an outer periphery of a wire harness and to be mounted in a through hole of an automobile body panel, the grommet comprising:

a tubular portion;

a tapered portion extending from one end of the tubular portion, the tapered portion including an automobile body engagement recess provided on an outer peripheral surface of the tapered portion to engage with the automobile body panel, the recess being formed by a first wall provided around the tapered portion at a large diameter end and a second wall provided around the tapered portion and located at a small diameter side of the first wall, the second wall facing the first wall across the recess;

a plurality of outer projecting strip portions provided on an outer peripheral surface of the tapered portion, the plurality of outer projecting strip portions extending in an axial direction of the tapered portion and being spaced from each other in a circumferential direction, the plurality of the outer projecting strip portions being arranged close to each other at a small diameter side of the tapered portion and being radially spread toward a large diameter side; and at least one small stepped portion provided on a sunken portion of the outer peripheral surface of the tapered portion between adjacent outer projecting strip portions, the small stepped portion projecting from an edge of the second wall toward the tubular portion.

18. The grommet according to claim 17, wherein the small stepped portion extends generally axially from the edge of the second wall toward the tubular portion.

19. The grommet according to claim 17, wherein the outer peripheral surface of the tapered portion defining the sunken portion between the adjacent outer projections includes a center groove at a center of the sunken portion in the circumferential direction;

wherein the center groove does not extend to the periphery of the edge of the second wall; and wherein the small stepped portion is provided on an extension of an end of the center groove.

20. The grommet according to claim 19, further comprising two outer side grooves along proximal portions of the plurality of the outer projecting strip portions, the two outer side grooves extending to a periphery of the edge of the second wall, and the two outer side grooves are located at both sides of the small stepped portion.

21. A grommet configured to engage around an outer periphery of a wire harness and to be mounted in a through hole of an automobile body panel, the grommet comprising:

a tubular portion;

a tapered portion extending from one end of the tubular portion, the tapered portion including an automobile body engagement first recess provided on an outer peripheral surface of the tapered portion to engage with the automobile body panel;

the first recess being formed by a first wall provided around the tapered portion at a large diameter end and a second wall provided around the tapered portion and located at a small diameter side of the first wall, the second wall facing the first wall across the first recess; and a plurality of outer projections provided on an outer peripheral surface of the tapered portion, the plurality of outer projections extending in an axial direction of the tapered portion and being spaced from each other in a circumferential direction, the plurality of outer projections being arranged close to each other at a small diameter side of the tapered portion and being radially spread apart toward a large diameter side, wherein at least one of the outer projections comprises an engagement portion, the engagement portion projecting from the outer peripheral surface of the tapered portion at the small diameter side of the tapered portion toward the tubular portion and defining a second recess between an outer peripheral surface of the tubular portion and an inner surface of the engagement portion.

22. The grommet according to claim 21, wherein the plurality of outer projections are arranged substantially adjacent each other in a circumferential direction at a small diameter side of the tapered portion and the respective one of the outer projections comprises the engagement portion, such that the engagement portions define an annular recess that extends between the outer peripheral surface of the tubular portion and the inner surfaces of the engagement portions.

23. The grommet according to claim 22, wherein the inner surfaces of the engagement portions extend substantially parallel to the outer surface of the tubular portion.

24. The grommet according to claim 23, wherein the engagement portion comprises a V-shaped recess.

25. The grommet according to claim 21, wherein the engagement portion comprises a V-shaped recess.

26. The grommet according to claim 21, wherein the inner surface of the engagement portion extends substantially parallel to the outer surface of the tubular portion.

27. The grommet according to claim 21, further comprising a plurality of inner projections provided on an inner peripheral surface of the tapered portion, the plurality of inner projections extending in the axial direction of the tapered portion and being spaced from each other in the circumferential direction, wherein the outer and inner projections are positioned at corresponding locations.

28. The grommet according to claim 21, wherein each of the plurality of the inner projections is positioned at a location corresponding to, and opposite from, a respective one of the plurality of outer projections.

29. The grommet according to claim 21, wherein a projection amount of the plurality of outer projections is changed at a contact point so that a first projection amount of the plurality of outer projections between the contact point and an edge of the second wall is smaller than a second projection amount of the plurality of outer projections between the contact point and a small diameter side end of the plurality of projections, the contact point being located substantially at a position where an outer surface of the plurality of outer projections first contacts an inner peripheral surface of the through hole when the grommet is inserted into the through hole from the end of the grommet having the tubular portion.

30. The grommet according to claim 21, further comprising a sunken portion including the outer peripheral surface of the tapered portion between adjacent outer projections, the sunken portion having at least one groove extending in the axial direction.

31. The grommet according to claim 30, wherein each groove extends in a direction between the tubular portion and an edge of the second wall.

32. The grommet according to claim 21, wherein the tapered portion further includes an inner recess in an inner peripheral surface of the tapered portion, the inner recess being located at an inner surface side of the second wall.

* * * * *

UNITED STATES PATENT AND TRADEMARK OFFICE
CERTIFICATE OF CORRECTION

PATENT NO.    : 6,603,078 B2
DATED         : August 5, 2003
INVENTOR(S)   : T. Okuhara et al.

It is certified that error appears in the above-identified patent and that said Letters Patent is hereby corrected as shown below:

<u>Column 24,</u>
Line 29, "claim 21" should be -- claim 27 --.

Signed and Sealed this

Thirtieth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,603,078 B2
DATED : August 5, 2003
INVENTOR(S) : T. Okuhara et al.

It is certified that error appears in the above-identified patent and that said Letters Patent is hereby corrected as shown below:

<u>Title page,</u>
Item [30], Foreign Application Priority Data, the following priority documents were omitted and should be included:

-- Jan. 25, 2001      (JP)……………..2001-017556
   Jan. 25, 2001      (JP)……………..2001-017643 --

Signed and Sealed this

Fifth Day of October, 2004

JON W. DUDAS
*Director of the United States Patent and Trademark Office*